(12) United States Patent
Capitani et al.

(10) Patent No.: US 10,611,543 B2
(45) Date of Patent: Apr. 7, 2020

(54) PACKAGING FOR ALCOHOLIC BEVERAGES, PROCESS OF MAKING SAID PACKAGING AND APPARATUS FOR PACKAGING BARRELS

(71) Applicant: Cryovac, Inc., Charlotte, NC (US)

(72) Inventors: Stefano Capitani, Milan (IT); Jvanohe Rizzi, Legnano (IT); Ferrante Folchini, Noceto (IT); Anacleto Galeazzi, Roveleto di Cadeo (IT)

(73) Assignee: Cryovac, LLC, Charlotte, NC (US)

( * ) Notice: Subject to any disclaimer, the term of this patent is extended or adjusted under 35 U.S.C. 154(b) by 8 days.

(21) Appl. No.: 15/540,929

(22) PCT Filed: Dec. 28, 2015

(86) PCT No.: PCT/IB2015/060014
§ 371 (c)(1),
(2) Date: Jun. 29, 2017

(87) PCT Pub. No.: WO2016/108176
PCT Pub. Date: Jul. 7, 2016

(65) Prior Publication Data
US 2018/0162621 A1 Jun. 14, 2018

(30) Foreign Application Priority Data

Dec. 29, 2014 (IT) .............................. MI2014A2268
Dec. 29, 2014 (IT) .............................. MI2014A2269

(51) Int. Cl.
*C12H 1/22* (2006.01)
*B65D 77/00* (2006.01)
(Continued)

(52) U.S. Cl.
CPC ............ *B65D 77/003* (2013.01); *B65B 35/00* (2013.01); *B65D 9/04* (2013.01); *C12H 1/14* (2013.01); *C12H 1/22* (2013.01)

(58) Field of Classification Search
CPC ........ B65D 77/003; B65D 9/04; B65D 25/34; B65D 25/36; B65B 35/00; C12H 1/14; C12H 1/22
(Continued)

(56) References Cited

U.S. PATENT DOCUMENTS

| 144,103 A | 10/1873 | Jenkins | |
| 2,943,940 A * | 7/1960 | Wiedemann | ........... B65D 25/34 426/124 |

(Continued)

FOREIGN PATENT DOCUMENTS

| DE | 20103153 U1 | 7/2001 |
| FR | 2571382 | 4/1986 |
| WO | 0134763 | 5/2001 |

*Primary Examiner* — Andrew T Kirsch
*Assistant Examiner* — Elizabeth J Volz
(74) *Attorney, Agent, or Firm* — Jason R. Womer

(57) ABSTRACT

Package (1) for beverages having an alcoholic contents (B) comprising: a wood barrel (2) configured for containing a predetermined quantity of an alcoholic beverage (B), at least one jacket (4) made of a plastic material film engaged outside the barrel (2) for covering at least a preponderant part of a lateral wall (2c) of the barrel itself, the jacket (4) comprises an elastically deformable tubular element (5) fitted at least partially around the lateral wall (2c) and exhibiting at least one elastically deformed portion intimately adhering to the barrel (2) lateral wall (2c); further an apparatus and process for making the package (1) by applying on the barrel (2) the jacket (4) having the shape of a first and second shells (7, 10) opposite to each other, are described.

12 Claims, 14 Drawing Sheets

(51) Int. Cl.
    *B65D 8/00*         (2006.01)
    *B65B 35/00*      (2006.01)
    *C12H 1/14*       (2006.01)

(58) Field of Classification Search
    USPC .......................................... 220/62.2; 217/72
    See application file for complete search history.

(56) References Cited

U.S. PATENT DOCUMENTS

| | | |
|---|---|---|
| 3,965,652 A | 6/1976 | Cimins |
| 6,183,982 B1* | 2/2001 | Nastasia ................. C12G 1/02 215/270 |
| 6,945,016 B2 | 9/2005 | Hannen |
| 2009/0061061 A1 | 3/2009 | Beckwith et al. |
| 2015/0037459 A1* | 2/2015 | Chidambarakrishnan ................... B32B 27/32 426/11 |
| 2016/0017265 A1 | 1/2016 | Chidambarakrishnan et al. |

* cited by examiner

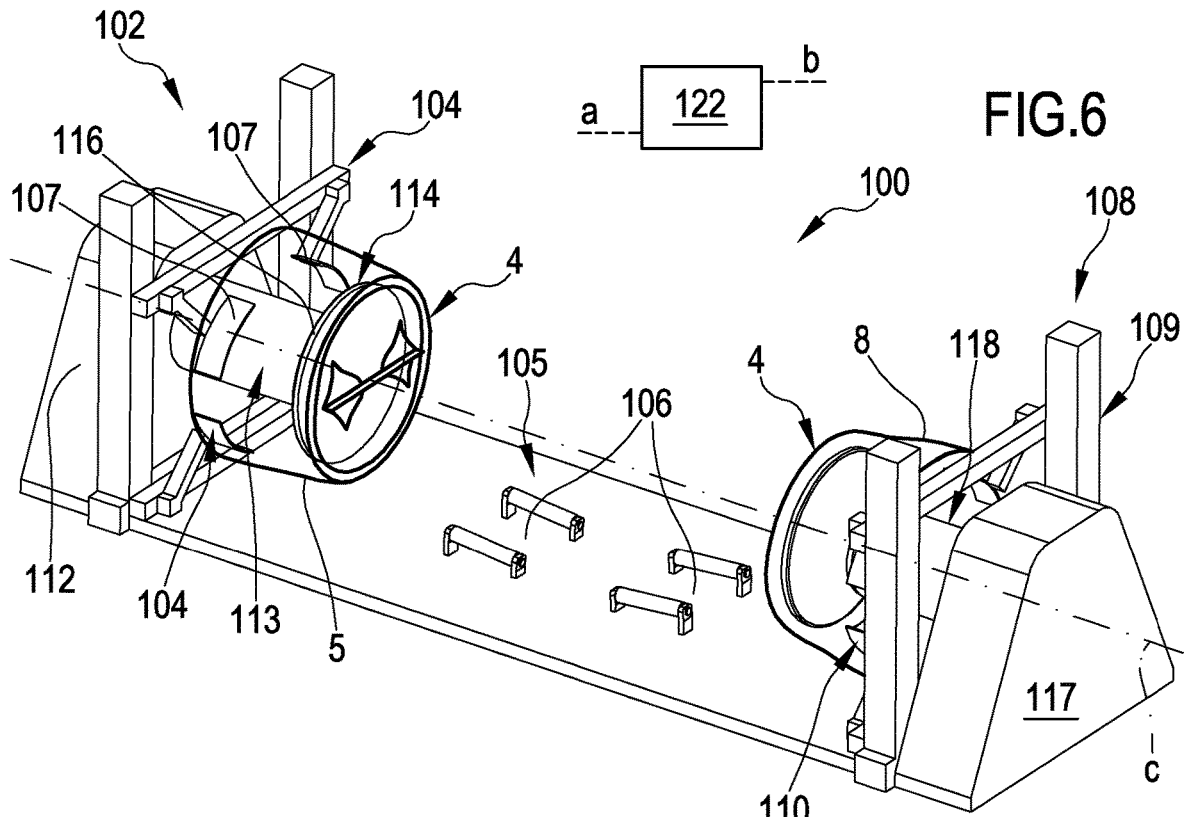
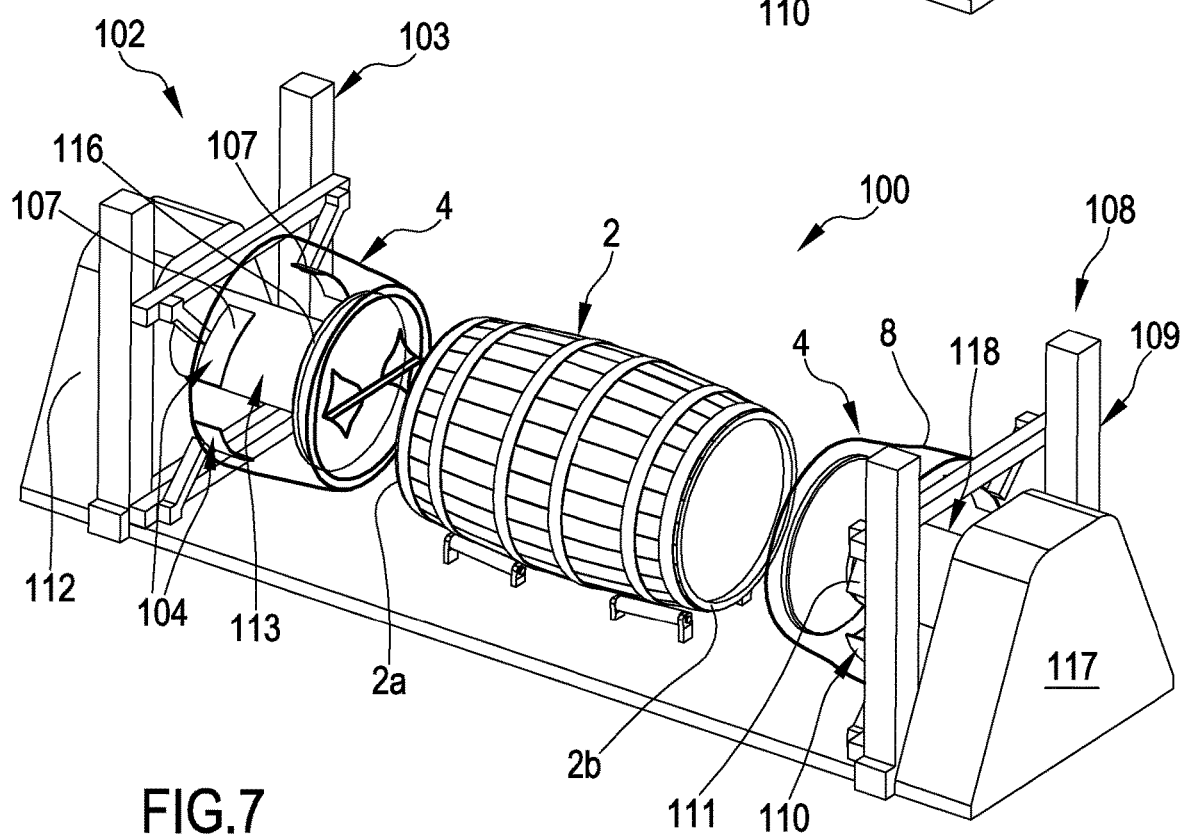

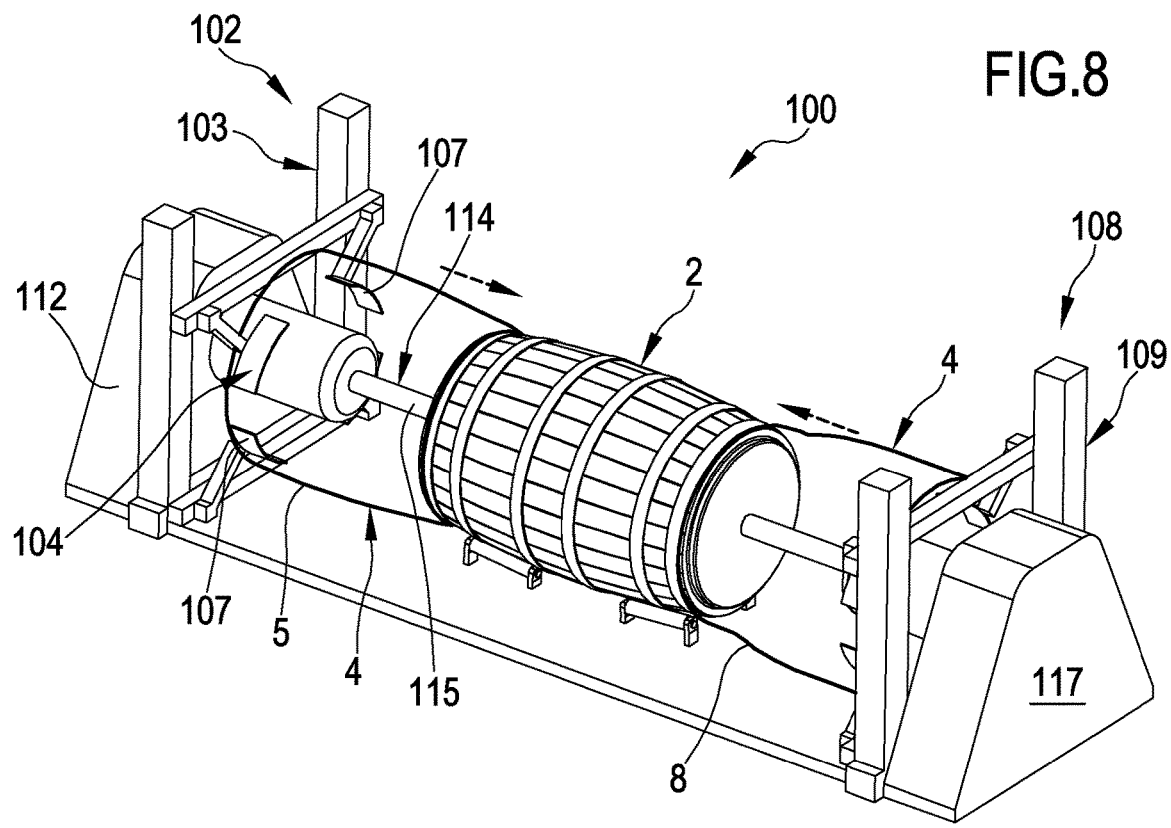
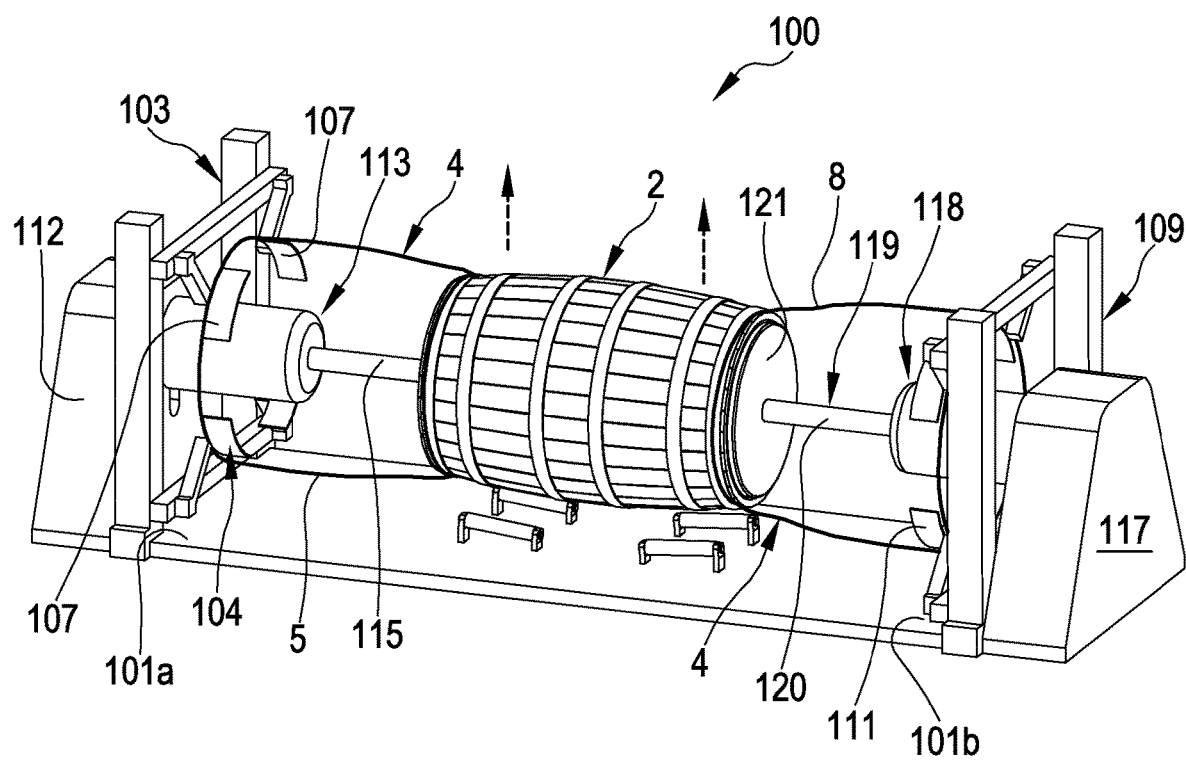

PACKAGING FOR ALCOHOLIC BEVERAGES, PROCESS OF MAKING SAID PACKAGING AND APPARATUS FOR PACKAGING BARRELS

FIELD OF THE INVENTION

The present invention refers to a package for alcoholic beverages, and a process for making said package. Further, the present invention refers to an apparatus and process of packaging wood barrels (or wood casks) containing alcoholic beverages. Generally, the invention is useable in the field of storing, holding and/or ageing alcoholic beverages—for example whiskey, vodka, rum, tequila, cognac, brandy, wine and beer—wherein an extended permanency of a beverage inside wood barrels or casks could be expected.

PRIOR ART

Generally, alcoholic beverages are produced from a step of preparing the must (consisting of cereals, grapes, wine, sugar cane, fruits, honey, for example) which is then fermented by yeasts. The fermented substance, possibly with the addition of alcohol, is then distilled: in this way it is possible to concentrate the ethyl alcohol present in the fermented product and select the desired substances.

The greater part of the produced alcoholic beverages, after the distillation, are subjected to an ageing step inside wood barrels or casks. The ageing depends on the beverage which it is desired to obtain and has a duration from a reduced time interval of about 18 months to more than 20 years. A generally known problem due to the ageing step refers to the beverage loss due to the evaporation thereof: about 2-50 wt. % of ethanol and water contained in the distillate evaporate and leak through the slats and heads of a barrel. Water and ethanol continuously diffuse and evaporate during all the ageing period, therefore the longer the ageing step is, the greater the distilled beverage losses are. The entity of the evaporation depends on plural factors such as for example: the initial contents of alcohol in the distillate, the ageing duration in the wood barrels, the values of the environmental humidity and temperature.

While ageing facilitates the aromatization of an alcoholic beverage, the losses of water and most of all of ethanol, cause a reduction of the proof following the ageing step. De facto, the evaporation besides reducing the volume of the produced beverage, changes the alcoholic and aromatic pattern characterizing the distillate before the ageing step: this therefore makes difficult to manage and foresee the ageing process of a beverage.

The ethanol loss, besides causing direct disadvantages on the alcoholic beverage, has a negative impact also in relation to the complexity and perilousness of the producing process. De facto, the release of ethanol in the environment entails a high explosion risk: the environment therefore must be suitably controlled in order to prevent complications. It is also noted that the ethanol released in the environment acts as an aid to the propagation of fungi and/or moulds which can therefore grow on the wall of the store housing the barrels and equipment used for ageing the beverage.

Therefore, these problems have led the producers to find solutions for reducing the percentage of lost beverage during the ageing. The first solution which is now adopted provides to close the barrel inside a bag of plastic material. The barrel containing the alcoholic beverage, is inserted in the bag—having a size much greater than the barrel size—which is then tightly closed at the top: the ample size of the bag enables to easily insert the barrel inside the same.

The plastic film forming the bag is waterproof and prevents the evaporating solution from leaking through the jacket: in this way the film reduces the ethanol evaporation.

Despite this first solution enables to reduce the beverage loss with respect to the uncovered barrels, it is not devoid of drawbacks. A first drawback is caused by the structure of the bag. De facto, the jacket wraps the barrel without a direct engagement between the parts: this instance makes the bag weak and easily tearable. The inherent weakness of the plastic jacket makes intricate the step of moving and storing a barrel. With reference instead to the plastic film, it is noted that the total water tightness of the bag, besides preventing an ethanol loss, prevents the oxygen to penetrate inside the barrel and reach the beverage therefore, in this way, it is prevented a correct oxygenation of the beverage contained in the barrel so that the ageing process is undesirably altered.

A second solution adopted now, provides wood barrels exhibiting, between the several slats, layers of a non-porous binding material adapted to prevent the alcoholic beverage from evaporating. De facto, these barrels are adapted to enable the beverage to evaporate only through the wood: the non-porous binding material reduces the total breathability of a barrel. This latter described solution, in comparison with the previous solution, has an undoubtedly stronger structure adapted to make easier to move and store a barrel; de facto, the non-porous barrel portion is stably incorporated in the structure of this latter. Despite this fact, also the second described solution is not devoid of drawbacks. De facto, the process of making barrels of this type is particularly complicated and expensive, this fact greatly affects the cost of each barrel. Further, it is noted that the breathability of a barrel is limited with respect both to the ethanol loss and the oxygen passage; as hereinbefore described, the oxygen passage inside the barrel is essential in promoting the chemical/physical processes leading to a correct ageing of a beverage. A further drawback of this latter solution is due to the fact that the ethanol exiting the barrel wood is directly dispersed in the environment, this fact introduces the risk of explosions and the propagation of fungi and moulds in the store housing the barrels.

A third known solution provides the use of metal barrels receiving the beverage and wood slats: the slats are suspended in the liquid and enable the distillate to absorb the aroma released from the wood. The beverage ageing in the metal barrel is promoted by introducing oxygen. Despite the fact this third solution prevents the ethanol to exit and enables to oxygenate the beverage, the Applicant has observed that also the metal barrels are not devoid of limitations and drawbacks. A first drawback is attributable to the material used for making the barrel: the metal, in comparison with the wood, has higher cost and weight. Further, the metal barrel is structurally complex because it requires to make one or more systems designed for introducing the oxygen.

Despite there are several solutions adopted for limiting the alcohol loss during the ageing, none of them proposes structurally simple, economical and flexible barrels with reference to their use. Further, no one of the known solutions has shown how to drastically reduce the losses by maintaining or improving the organoleptic properties of the alcoholic beverage.

OBJECT OF THE INVENTION

Therefore, the object of the present invention consists of substantially solving at least one of the drawbacks and/or limitations of the previous solutions.

A first object of the invention consists of providing a solution for packaging barrels which enables to minimize the evaporation of at least part of the alcohol contained in the barrel, once packaged.

A further object of the invention is to offer a solution capable of maintaining ad adequate oxygen exchange between the liquid contained in the barrel and the outer environment.

Further, it is a secondary object of the invention to provide a technical solution enabling to effectively and completely cover the barrel, without wasting material.

A further object consists of providing a package, a packaging process and a relative apparatus enabling to accurately packaging a barrel to be packaged in relatively short times.

A further object of the invention consists of making a packaged barrel for alcohol containing beverages which can be easily moved and stored by avoiding to impair the structure. It is a further object of the invention to provide a package for alcohol containing beverages which has a flexible use and therefore could be used for ageing different kinds of beverages.

SUMMARY

One or more of the above described objects which will better appear during the following description, are substantially met by the invention according to one or more of the accompanying claims.

The aspects of the invention are described in the following.

In a 1st aspect, it is provided a package (1) for alcoholic beverages (B) comprising:
  at least one barrel (2) made at least partially of wood, delimiting a compartment (3) configured for containing a predetermined quantity of an alcoholic beverage (B), the barrel (2) comprising:
    a lateral wall (2c),
    a first and second longitudinal closing portions (2a, 2b) closely engaged with the axially opposite ends of the lateral wall (2c), the first and second longitudinal closing portions (2a, 2b) cooperatively with the lateral wall (2c), delimiting said compartment (3),
  at least one jacket (4) made of a plastic material film, externally engaged with the barrel (2) by covering at least a preponderant part of the lateral wall (2c) of the barrel (2) itself.

In a 2nd aspect according to the 1st aspect, the jacket (4) comprises at least one elastically deformable tubular element (5, 8) fitted on said preponderant part of the barrel (2) lateral wall (2c) and exhibiting at least one elastically deformed portion placed with an intimate adhesion to an external surface of the barrel (2) lateral wall.

In a 3rd aspect according to anyone of the preceding aspects, the jacket (4) covers at least the 50% of the barrel (2) lateral wall (2c).

In a 4th aspect according to anyone of the preceding aspects, the jacket (4) covers at least the 70% of the barrel (2) lateral wall (2c).

In a 5th aspect according to anyone of the preceding aspects, the jacket (4) covers the whole lateral wall (2c) of the barrel (2).

In a 6th aspect according to anyone of the preceding aspects, the elastically deformed portion of said at least one tubular element (5, 8) placed with an intimate adhesion to the external surface of the barrel (2) lateral wall (2c) contacts at least the 50% of the total extension of the external surface of the barrel (2) lateral wall (2c).

In a 7th aspect according to anyone of the preceding aspects, the elastically formed portion of said at least one tubular element (5, 8) placed with an intimate adhesion to the external surface of the barrel (2) lateral wall (2c) contacts at least the 70% of the total extension of the external surface of the barrel (2) lateral wall (2c).

In an 8th aspect according to anyone of the preceding aspects, the barrel (2) exhibits:
  a first half extending from a first axially end of the barrel (2) to a maximum or mid cross-section of the barrel (2),
  a second half extending from the maximum or mid cross-section, respectively, of the barrel (2) to a second axial end of the barrel (2),
and wherein said at least one tubular element of said jacket (4) comprises:
  a first elastically deformable tubular element (5) fitted on the lateral wall (2c) of the first barrel (2) half and exhibiting at least one respective elastically deformed portion placed with an intimate adhesion to at least part of an external surface of the lateral wall (2c) of the first half of the barrel (2), optionally the elastically deformed portion of the first tubular element extending longitudinally at least along the 50%, particularly at least along the 70%, of the axial extension of the lateral wall (2c) of the first half of the barrel (2);
  a second elastically deformable tubular element (8) fitted on the lateral wall (2c) of the second half of the barrel (2) and exhibiting at least one respective elastically deformed portion placed with an intimate adhesion to at least part of an external surface of the lateral wall (2c) of the second half of the barrel (2), optionally the elastically deformed portion of the second tubular element extending longitudinally at least along the 50%, particularly at least along the 70%, of the axial extension of the lateral wall (2c) of the second half of the barrel (2).

In a 9th aspect according to the preceding aspect, the elastically deformed portion of the first tubular element extends longitudinally at least along the 70% of the axial extension of the lateral wall (2c) of the first half of the barrel (2).

In a 10th aspect according to anyone of the preceding two aspects, the elastically deformed portion of the second tubular element extends longitudinally at least along the 70% of the axial extension of the lateral wall (2c) of the second half of the barrel (2).

In an 11th aspect according to anyone of the preceding three aspects, the jacket (4) comprises a first shell (7) including said first tubular element (5) and at least one first base (6) terminally joined to the first tubular element, the first base (6) being placed at the first longitudinal closing portion (2a) of the barrel (2) and the first tubular element (5) wrapping the lateral wall of the first half of the barrel (2).

In a 12th aspect according to anyone of the preceding four aspects, the jacket (4) comprises a second shell (10) including said second tubular element (8) and at least one second base (9) terminally joined to the second tubular element (8), the second base (9) being placed at the second longitudinal closing portion (2b) of the barrel (2) and the second tubular element (8) wrapping the lateral wall of the second half of the barrel (2).

In a 13th aspect according to anyone of the preceding two aspects, the first tubular element (5) and first base (6) of the first shell (7) are integrally joined to define a respective single body.

In a 14th aspect according to anyone of the preceding two aspects, the second tubular element (8) and second base (9) of the second shell (10) are integrally joined to define a respective single body.

In a 15th aspect according to anyone of the aspects from 12 to 14, the first and second shells together cover at least the 90% of the barrel (2) external surface.

In a 16th aspect according to the preceding aspect, the first and second shells together cover the 100% of the barrel (2) external surface.

In a 17th aspect according to anyone of the aspects from 11 to 16, said first shell (7) is obtained starting from a respective first tubular shape precursor body welded on itself in order to define said first base at which a first welding band (26) is formed.

In an 18th aspect according to anyone of the aspects from 12 to 17, said second shell (10) is obtained starting from a respective second tubular shape precursor body welded on itself in order to define said second base (9) at which a second welding band (29) is formed.

In a 19th aspect according to the preceding aspect, said second precursor body is a tubular body distinct from the first precursor body.

In a 20th aspect according to the aspect 18, the second precursor body is defined by a distinct segment of the same tubular body of the first precursor body. In other words, the first tubular body and then the second tubular body are obtained starting from the same precursor body.

In a 21st aspect according to anyone of the preceding four aspects, the first welding band (26) comprises:
- a pair of lips (26a, 26b) emerging from said first base (6) and welded to each other at mutually facing surfaces, and
- on each side of said lips (26a, 26b), a respective strip (26c, 26d) retracting towards a central area (26f) of the welding band, wherein terminal portions of said lips (26a, 26b) and said strips (26c, 26d) define—on each side of the first welding band—cooperatively with said first base—a respective connection bellows (26g, 26h).

Generally, it is observed that the lips (26a, 26b) and strips (26c, 26d) retracting on each side towards a central area (26f) of the welding band are reciprocally welded to each other along the reciprocally contacting surfaces in order to define a continuous weld forming with the first base said bellows which is substantially positioned in a plane transversal to the first base itself.

In a 22nd aspect according to anyone of the preceding four aspects, the second welding band (9a) comprises:
- a pair of lips (29a, 29b) emerging from said second base (9) and welded to each other at mutually facing surfaces, and
- on each side of said lips (29a, 29b), a respective strip (29c, 29d) retracting towards a central area (29f) of the welding band, wherein terminal portions of said lips (29a, 29b) and said strips (29c, 29d) define—on each side of the second welding band—cooperatively with said second base—a respective connection bellows (29g, 29h).

Generally, it is observed that the lips (29a, 29b) and strips (29c, 29d) retracting on each side towards a central area (29f) of the welding band are reciprocally welded to each other along the mutually contacting surfaces in order to define a continuous weld forming with the second base said bellows which is substantially positioned in a plane transversal to the second base itself.

In a 23rd aspect according to anyone of the preceding two aspects, said first shell (7) is turned inside out in order to arrange said first welding band (26) in a position emerging from said first base (6) and extending towards the interior of the first shell (7).

In a 24th aspect according to anyone of the preceding two aspects, said second shell (10) is turned inside out in order to arrange said second welding band (29) in a position emerging from said second base (9) and extending towards the interior of the second shell (10).

In a 25th aspect according to anyone of the preceding four aspects, the lateral wall (2c) comprises a first and second end edges (2d, 2f); wherein the first end edge (2d) is perimetrally arranged around the first closing portion (2a) and axially protrudes from an external surface of this latter in order to define a first compartment (27) delimited by said external surface of the first closing portion (2a) and by a radially internal surface of the first end edge (2d); wherein the second end edge (2f) is perimetrally around the second closing portion (2b) and axially protrudes from this latter in order to define a second compartment (28) delimited by an external surface of the second closing portion (2b) and by a radially internal surface of the second end edge (2f); and wherein the first welding band (26) is housed in said first compartment and the second welding band (29) is housed in said second compartment.

In a 26th aspect according to anyone of the aspects from 8 to 25, the first tubular element (5) of the jacket (4) completely wraps the lateral wall (2c) of the first half of the barrel (2) and at least a portion of the lateral wall (2c) of the second half of the barrel (2).

In a 27th aspect according to the preceding aspect, the first tubular element (5) wraps at least the 10% of the lateral wall (2c) of the second half of the barrel (2).

In a 28th aspect according to anyone of the aspects from 8 to 27, wherein the second tubular element (8) of the jacket (4) completely wraps the lateral wall (2c) of the second half of the barrel (2) and at least a portion of the lateral wall (2c) of the first half of the barrel (2).

In a 29th aspect according to the preceding aspect, the second tubular element (8) wraps at least the 10% of the lateral wall (2c) of the first half of the barrel (2).

In a 30th aspect according to anyone of the preceding four aspects, at least one terminal strip of the second tubular element (8) overlaps a terminal strip of the first tubular element (5), in order to define an overlapping area having an axial extension comprised between 5% and 25% of the axial extension of the barrel (2) lateral wall (2c).

In a 31st aspect according to the preceding aspect, said overlapping area extends at a longitudinally central area of the barrel (2) lateral wall (2c).

In a 32nd aspect according to anyone of the preceding two aspects, the elastically deformed portion of the first tubular element (5) comprises all, or at least part of the terminal strip of the first tubular element (5), and wherein the elastically deformed portion of the second tubular element (8) comprises all, or at least part of the terminal strip of the second tubular element (5).

In a 33rd aspect according to anyone of the aspects from 12 to 32, wherein the first and second shells (7, 10) are axially opposite to each other: the first shell (7) covers the first longitudinal closing portion (2a) and at least the first half of the barrel (2), while the second shell (10) covers the second longitudinal closing portion (2b) and at least the second half of the barrel (2).

In a 34th aspect according to anyone of the preceding aspects:
- the barrel (2) lateral wall (2c) exhibits a substantially circular shape cross-section having a diameter increasing from the first longitudinal closing portion (2a) to a maximum or mid cross-section of the barrel (2) and therefore a decreasing trend from said maximum or mid cross-section to the second longitudinal closing portion (2b) of the barrel (2), and the jacket (4) is configured for switching from:
an undeformed condition, defined before the engagement around the barrel (2), wherein the tubular element (5, 8) of the jacket (4) has a substantially cylindrical shape having a diameter greater than the diameter defined by the lateral wall (2c) at the first and second longitudinal closing portions (2a, 2b) and less than the diameter defined by the lateral wall (2c) at the maximum or mid cross-section of the barrel (2), to
an at least elastically deformed condition wherein the tubular element is fitted on the barrel and exhibits a diameter varying along the longitudinal axis of the barrel (2) lateral wall (2c), said varying diameter exhibiting a maximum value at said maximum or mid cross-section of the barrel (2).

In a 35th aspect according to the preceding aspect, the ratio of the diameter defined by the jacket (4) under an undeformed condition to the diameter of the lateral wall (2c) at the first and/or second longitudinal closing portions (2a, 2b) is greater than 1.

In a 36th aspect according to the preceding aspect, the ratio of the diameter defined by the jacket (4) under an undeformed condition to the diameter of the lateral wall (2c) at the first and/or second longitudinal closing portions (2a, 2b) is comprised between 1.05 and 1.2.

In a 37th aspect according to anyone of the preceding three aspects, the ratio of the diameter defined by the jacket (4) under an undeformed condition to the diameter of the lateral wall (2c) at the maximum or mid cross-section of the barrel (2) is less than 1.

In a 38th aspect according to anyone of the preceding four aspects, the ratio of the diameter defined by the jacket (4) under an undeformed condition to the diameter of the lateral wall (2c) at the maximum or mid cross-section of the barrel (2) is comprised between 0.8 and 0.95.

In a 39th aspect according to anyone of the preceding aspects, the plastic film forming the jacket (4) exhibits an ethanol permeability ETR (ethanol transmission rate) less than 25 g/m$^2$/day, or less than 20 g/m$^2$/day, or less than 15 g/m$^2$/day, or less than 10 g/m$^2$/day, or less than 8 g/m$^2$/day, or less than 6 g/m$^2$/day, or less than 5 g/m$^2$/day, or less than 4 g/m$^2$/day, o less than 3 g/m$^2$/day, or less than 2.5 g/m$^2$/day, or less than 2 g/m$^2$/day, or less than 1.5 g/m$^2$/day, or less than 1.4 g/m$^2$/day, or less than 1.3 g/m$^2$/day, or less than 1.2 g/m$^2$/day, or less than 1.1 g/m$^2$/day, or less than 1.0 g/m$^2$/day, or less than 0.9 g/m$^2$/day, or less than 0.8 g/m$^2$/day, or less than 0.7 g/m$^2$/day, or less than 0.6 g/m$^2$/day, or less than 0.5 g/m$^2$/day, or less than 0.4 g/m$^2$/day, or less than 0.3 g/m$^2$/day, or less than 0.25 g/m$^2$/day.

In a 40th aspect according to the preceding aspect, the plastic film forming the jacket (4) exhibits an ethanol permeability ETR (ethanol transmission rate) less than 25 g/m$^2$/day, for example less than 8 g/m$^2$/day.

In a 41st aspect according to anyone of the preceding aspects, the plastic film forming the jacket (4) exhibits an ethanol permeability ETR (ethanol transmission rate) from 0.05 to 40 g/m$^2$/day, or 0.1-35 g/m$^2$/day, or from 0.2 to 1 g/m$^2$/day, or 0.11-30 g/m$^2$/day, or 0.12-25 g/m$^2$/day, or 0.13-20 g/m$^2$/day, or 0.14-15 g/m$^2$/day, or from 0.15 to 10 g/m$^2$/day, or from 0.15 to 8 g/m$^2$/day, or from 0.15 to 6 g/m$^2$/day, or from 0.15 to 4 g/m$^2$/day, or from 0.15 to 2 g/m$^2$/day, or 0.16-1.5 g/m$^2$/day, or 0.17-1.4 g/m$^2$/day, or 0.18-1.3 g/m$^2$/day, or 0.19-1.2 g/m$^2$/day, or from 0.2 to 1 g/m$^2$/day.

In a 42nd aspect according to the preceding aspect, the plastic film forming the jacket (4) exhibits an ethanol permeability ETR (ethanol transmission rate) comprised between 0.1 and 25 g/m$^2$/day, or comprised between 0.15 and 8 g/m$^2$/day.

In a 43rd aspect according to anyone of the preceding aspects, wherein the plastic film of the jacket (4) is a multilayer film comprising at least one ethanol barrier layer.

In a 44th aspect according to the preceding aspect, said jacket plastic film has a thickness comprised between 0.01 and 2 mm or said jacket plastic film has a thickness between 0.05 and 1 mm. In a variant, said jacket plastic film has a thickness between 0.05 and 0.2 mm.

In a 45th aspect according to anyone of the preceding aspects, said jacket plastic film has a water vapour permeability MVTR (moisture vapour transmission rate) less than 15 g/m$^2$/day, or less than 12 g/m$^2$/day, or less than 10 g/m$^2$/day, or less than 9 g/m$^2$/day, or less than 8 g/m$^2$/day, or less than 7 g/m$^2$/day, or less than 6 g/m$^2$/day, or less than 5 g/m$^2$/day, or less than 4 g/m$^2$/day, or less than 3 g/m$^2$/day, or less than 2.5 g/m$^2$/day, or less than 2 g/m$^2$/day, or less than 1.5 g/m$^2$/day, or less than 1.4 g/m$^2$/day, or less than 1.3 g/m$^2$/day, or less than 1.2 g/m$^2$/day, or less than 1.1 g/m$^2$/day, or less than 1 g/m$^2$/day, or less than 0.9 g/m$^2$/day, or less than 0.8 g/m$^2$/day, or less than 0.7 g/m$^2$/day, or less than 0.6 g/m$^2$/day, or from 0.1 to 30 g/m$^2$/day, or from 0.15 to 15 g/m$^2$/day, or from 0.2 to 12 g/m$^2$/day, or from 0.2 to 11 g/m$^2$/day, or from 0.3 to 10 g/m$^2$/day, or from 0.3 to 8 g/m$^2$/day, or from 0.3 to 6 g/m$^2$/day, or from 0.3 to 5 g/m$^2$/day, or from 0.3 to 4 g/m$^2$/day, or from 0.3 to 3 g/m$^2$/day, or from 0.3 to 2 g/m$^2$/day, or from 0.3 to 1.5 g/m$^2$/day, or from 0.35 to 1 g/m$^2$/day, or from 0.35 to 0.9 g/m$^2$/day, or from 0.35 to 0.8 g/m$^2$/day, or from 0.4 to 0.7 g/m$^2$/day, or from 0.45 to 65 g/m$^2$/day.

In a 46th aspect according to anyone of the preceding aspects, the jacket plastic film can have an oxygen permeability OTR (oxygen transmission rate) of at least 60 cc/m$^2$/day, or at least 70 cc/m$^2$/day, or at least 80 cc/m$^2$/day, or at least 90 cc/m$^2$/day, or at least 100 cc/m$^2$/day, or at least 110 cc/m$^2$/day, or at least 120 cc/m$^2$/day, or at least 130 cc/m$^2$/day, or at least 140 cc/m$^2$/day, or at least 150 cc/m$^2$/day, or at least 160 cc/m$^2$/day, or at least 170 cc/m$^2$/day, or at least 180 cc/m$^2$/day, or at least 190 cc/m$^2$/day, or at least 200 cc/m$^2$/day.

For example, the jacket plastic film can have an oxygen permeability OTR from 50 to 2000 cc/m$^2$/day, or 60-1800 cc/m$^2$/day, or 70-1700 cc/m$^2$/day, or 80-1500 cc/m$^2$/day, or 80-1200 cc/m$^2$/day, or 80-1000 cc/m$^2$/day, or 80-800 cc/m$^2$/day, or 80-700 cc/m$^2$/day, or 80-600 cc/m$^2$/day, or 80-500 cc/m$^2$/day, or 90-450 cc/m$^2$/day, or 100-400 cc/m$^2$/day, or 110-375 cc/m$^2$/day, or 120-350 cc/m$^2$/day, or 130-350 cc/m$^2$/day, or 140-350 cc/m$^2$/day, or 150-350 cc/m$^2$/day, or 160-340 cc/m$^2$/day, or 170-330 cc/m$^2$/day, or 180-320 cc/m$^2$/day, or 190-310 cc/m$^2$/day, or 200-300 cc/m$^2$/day.

In a 47th aspect according to anyone of the preceding aspects, said jacket plastic film comprises: an internal layer as ethanol barrier layer, a first external layer defining an external surface of the package, and a second external layer opposite to the first external layer and active as a heat-sealable layer.

In a 48th aspect according to the preceding aspect, the ethanol internal barrier layer is interposed between the first and second external layers and comprises a cyclic olefin polymer, COP, or a cyclic olefin copolymer, COC.

In a 49th aspect according to anyone of the preceding aspects, the jacket plastic film exhibits an elongation at break equal to at least 500%.

In a 50th aspect according to anyone of the preceding aspects, the jacket plastic film exhibits an elastic recovery equal to at least 10%.

In a 51st aspect it is provided a process for making a barrel packaged by using a package (1) according to anyone of the preceding aspects.

In a 52nd aspect according to the preceding aspect, said process comprises at least the following steps:
providing at least one barrel (2),
inserting the desired amount of an alcoholic beverage in the barrel (2),
providing at least one said jacket (4),
fitting at least the tubular element (5, 8) of the jacket (4) on the barrel (2) lateral wall (2c) so that the same jacket (4) can externally wraps at least a preponderant part of the barrel (2) external surface, the fitting step comprising to radially elastically deform at least part of the tubular element (5, 8) so that at least the elastically deformed part is positioned with an intimate adhesion on the barrel (2) lateral wall (2c).

In a 53rd aspect according to the preceding aspect, the barrel is kept with a longitudinal symmetry axis horizontally arranged during said fitting step.

In a 54th aspect according to the aspect 53, the barrel is kept with the longitudinal symmetry axis vertically arranged during said fitting step.

In a 55th aspect according to anyone of the preceding three aspects, the process comprises:
obtaining said first shell (7) from a respective first tubular shape precursor body by welding mutually facing surfaces of the first precursor body in order to form the first welding band (26), optionally separating a segment of the first precursor body from the remainder of the first precursor body at the first welding band, in order to define said first base (6) at which the first welding band extends,
obtaining said second shell (10) from a respective second tubular shape precursor body by welding mutually facing surfaces of the second precursor body in order to form the second welding band (29), optionally by separating a further segment of the second precursor body from the remainder of the second precursor body at the first welding band, and in order to define said second base (9) at which the second welding band (20) extends; particularly wherein said second precursor body is a tubular body distinct from the first precursor body or, alternatively, wherein the second precursor body is defined by the same tubular body of the first precursor body after separating said segment.

In a 56th aspect according to the preceding one, wherein said first shell (7) is turned inside out, in order to arrange said first welding band (26) in a position emerging from said first base (6) and extending towards the interior of the first shell (7), and wherein said second shell (10) is turned inside out, in order to arrange said second welding band (29) in a position emerging from said second base (9) and extending towards the interior of the second shell (10), and wherein the first welding band (26) is housed in said first compartment and the second welding band (29) is housed in said second compartment.

A 57th aspect refers to a package (1) according to anyone of the preceding aspects from 1 to 50 for containing alcoholic or super alcoholic beverages in said barrel (2).

A 58th aspect refers to an apparatus (100) for packaging barrels (2) destined to contain alcoholic beverages (B), the barrel (2) being of a type comprising:
a lateral wall (2c),
a first and second longitudinal closing portions (2a, 2b) closely engaged to the axially opposite ends of the lateral wall (2c), the first and second longitudinal closing portions (2a, 2b) cooperatively with the lateral wall (2c), delimiting said compartment (3),
the apparatus (100) comprising:
at least one base (101) configured for receiving and supporting a barrel (2) in a horizontal position, wherein a longitudinal axis of said lateral wall (2c) is horizontally arranged, and the first and second longitudinal closing portions (2a, 2b) are vertically arranged,
at least one fitting group (102) engaged at the base (101), said fitting group (102) exhibiting at least one frame (103) horizontally movable with respect to the base (101) along a fitting direction (C) between a starting position, defined at a first portion, optionally an end portion, (101a) of the base (101), and a final position, spaced from the first portion (101a), the frame (103) comprising at least one guiding element (104) configured for engagingly receiving at least one jacket (4), made of a plastic material film having at least one tubular element (5, 8),
wherein, under a working condition where said base (101) receives said barrel (2) in said horizontal position, the frame (103) is configured for:
in the starting position, being arranged distantly from the barrel (2), and enabling to position and engage the jacket (4) on the guiding element (104),
after positioning the jacket (4) on the guiding element (104), horizontally moving along the fitting direction (C) and enabling the guiding element (104) to fit the jacket (4) on the barrel (2).

A 59th aspect refers to an apparatus (100) for packaging barrels (2) destined to contain alcoholic beverages (B), the barrel (2) being of a type comprising:
a lateral wall (2c),
a first and second longitudinal closing portions (2a, 2b) closely engaged with the axially opposite ends of the lateral wall (2c), the first and second longitudinal closing portions (2a, 2b) cooperatively with the lateral wall (2c), delimiting said compartment (3),
the apparatus (100) comprising:
at least one base (101) configured for receiving and supporting a barrel (2) in a vertical position, wherein a longitudinal axis of said lateral wall (2c) is vertically arranged, and the first and second longitudinal closing portions (2a, 2b) are horizontally arranged,
at least one fitting group (102) engaged at the base (101), said fitting group (102) exhibiting at least one frame (103) vertically movable with respect to the base (101) along a fitting direction (C) between a starting position, defined at a first portion, optionally an end portion, (101a) of the base (101), and a final position, spaced from the first portion (101a), the frame (103) comprising at least one guiding element (104) configured for engagingly receiving at least one jacket (4), made of a plastic material film having at least one tubular element (5, 8),
wherein, under a working condition wherein said base (101) receives said barrel (2) in said vertical position, the frame (103) is configured for:
in the starting position, being arranged distantly from the barrel (2), and enabling to position and engage the jacket (4) on the guiding element (104), after positioning the jacket (4) on the guiding element (104), vertically moving along the fitting direction (C) and enabling the guiding element (104) to fit the jacket (4) on the barrel (2).

In a 60th aspect according to anyone of the preceding two aspects, the frame (103) of the fitting group (102) is configured for moving along the base (101) to a final position in which at least the guiding element (104) is arranged besides a maximum or mid cross-section of a barrel (2) received from the base (101) in said horizontal or vertical position, respectively.

In a 61st aspect according to anyone of the preceding three aspects, the base (101) comprises at least one abutment portion (105)—extending between said first portion (101a) of the base and a second portion, for example an end portion (101b) of the base (101) —defining a recess (106) configured for receiving and stably engaging the lateral wall (2c) of at least one barrel (2), so that a barrel (2) received from the base (101) in said horizontal or vertical position, respectively, is arranged between the first and second horizontal abutment portions (101a, 101b) on the lateral wall (2c) thereof.

In a 62nd aspect according to anyone of the preceding four aspects, the guiding element (104) comprises a plurality of, optionally at least four, pushers (107) configured for externally receiving the tubular element (5, 8) of the jacket (4) and arranging this latter in a circular arrangement substantially countershaped to the external lateral wall (2c) of a barrel (2) received in said horizontal or vertical position, respectively, the guiding element (104), after moving the frame from the starting position to the final one, being configured for fitting the tubular element (5, 8) externally to the barrel (2) so that the jacket (4) can cover at least a preponderant part of the lateral wall (2c) of the barrel itself.

In a 63rd aspect according to anyone of the preceding five aspects, the apparatus comprises a control system (122) connected to the fitting group (102) and active on said frame (103), said control system (122) being configured for commanding the frame to move and arranging the jacket (4) on a barrel (2) received in said horizontal or vertical position, respectively, so that the tubular element (5, 8) can cover at least the 50%, particularly at least the 70%, of the barrel (2) lateral wall (2c), optionally the whole barrel (2) lateral wall (2c).

In a 64th aspect according to anyone of the preceding six aspects, the guiding element (104) is configured for:
being placed in a first operative condition wherein the pushers (107) are radially approached each other in order to define substantially a first circumference enabling the engagement of the tubular element (5, 8) on the guiding element (104),
being placed in a second operative condition wherein the pushers (107) are radially spaced from each other with respect to the first operative condition in order to define a second circumference having a diameter greater than the one of the first circumference,
the guiding element (104), after switching from the first to the second operative conditions, being configured for tensioning the tubular element (5, 8) so that the same can be stably engaged to the guiding element,
the frame (103) being configured, by commanding said control system (122), for switching from the starting position to the final one, and then translating along the fitting direction (C) and enabling to position the jacket (4) on the barrel (2), the guiding element (104) being arranged in the second operative condition.

In a 65th aspect according to anyone of the preceding seven aspects, the apparatus is configured for engaging a jacket comprising a first and second tubular elements (5, 8) distinct from each other, wherein:
the guiding element (104) of the fitting group (102) is configured for engagingly receiving the first tubular element (5) of the jacket,
said apparatus comprises at least one further fitting group (108) axially opposite to the fitting group (102), the further fitting group (108) exhibiting at least one respective frame (109) horizontally (or vertically, respectively) slidingly movable with respect to the base (101) along a respective fitting direction (C) between a starting position defined at a second end portion (101b) of the base (101) and a final position spaced from the second end portion (101b) with respect to the starting position, the frame (109) of the further fitting group (108) comprising at least one respective guiding element (110) configured for engagingly receiving the second tubular element (8) of the jacket,
wherein, under the working condition wherein said base (101) receives said barrel (2) in said horizontal (or vertical, respectively) position, the frame (109) of the further fitting group (108) is configured for:
in the starting position, being distantly arranged from the barrel (2) and enabling to position and engage the jacket (4) on the guiding element (110),
after positioning the jacket (4) on the guiding element (110), horizontally (or vertically, respectively) moving along the fitting direction (C) and enabling the guiding element (104) to fit the jacket (4) on the barrel (2).

In a 66th aspect according to anyone of the eight preceding aspects, wherein the fitting direction (C) of the frame of the fitting group and/or the further fitting group is rectilinear and parallel to the longitudinal axis of said lateral wall (2c) of a barrel (2) received from the base (101) in said horizontal (or vertical, respectively) position.

In a 67th aspect according to anyone of the preceding two aspects, the frames (103, 109) of the fitting group (102) and of the further fitting group (108), respectively, move along a same fitting direction (C),
the frame (103) of the fitting group (102) being configured for horizontally (or vertically, respectively) moving along the base (101) approaching and away from the further fitting group (108),
the frame (109) of the further fitting group (108) being configured for horizontally (or vertically, respectively) moving along the base (101) approaching and away from the further fitting group (108).

In a 68th aspect according to anyone of the preceding three aspects, the frame (109) of the further fitting group (108) is configured for translating along the base (101) to the final position in which at least the guiding element (110) is arranged besides a maximum or mid cross-section of a barrel (2) received from the base (101) in said horizontal (or vertical, respectively) position.

In a 69th aspect according to anyone of the preceding four aspects, the guiding element (110) of the further fitting group (108) comprises a plurality of, preferably at least four, pushers (111) configured for externally receiving the further tubular element (8) of the jacket (4) and arranging this latter in a circular configuration substantially countershaped to the barrel (2) lateral wall (2c), the guiding element (110) of the further fitting group (108), after moving the frame from the starting position to the final position, being configured for fitting the second tubular element (8) outside the barrel (2)

so that the jacket (4) can cover at least a preponderant part of the lateral wall (2*c*) of the barrel itself.

In a 70th aspect according to anyone of the preceding five aspects, the control system (122) is connected to the further fitting group (108) and is active on said frame (109), said control system (122) being configured for commanding the frame of the further fitting group (108) to move and arranging the jacket (4) around the barrel (2) received in said horizontal position, so that the tubular element (5, 8) can cover at least the 50%, particularly at least the 70%, of the barrel (2) lateral wall (2*c*), optionally the whole barrel (2) lateral wall (2*c*).

In a 71st aspect according to anyone of the preceding two aspects, the guiding element (110) of the further fitting group (108) is configured for:
- being placed in a first operative condition wherein the pushers (111) of the group itself are radially approached each other in order to substantially define a first circumference enabling to engage the second tubular element (8) on the guiding element (110),
- being placed in a second operative condition wherein the pushers (111) of the same group are radially spaced from each other with respect to the first operative condition in order to define a second circumference having a diameter greater than the one of the first circumference, the guiding element (110) of the further fitting group (108), after switching from the first to the second operative conditions, being configured for tensioning the second tubular element (8) so that the same can be stably engaged to the guiding element, the frame (109) of the further fitting group (108) being configured for switching from the starting position to the final one, and then sliding along the fitting direction (C) and enabling to position the jacket (4) around the barrel (2), the guiding element (110) of the same group being arranged in the second operative condition.

In a 72nd aspect according to anyone of the preceding seven aspects, the control system (122) is configured for commanding the frame (109) of the further fitting group (108) to move along the base (101) from the starting position to the final one in a delayed manner with respect to the movement from the starting position to the final one, of the frame (103) of the fitting group (102) so that the second tubular element (8) can be fitted on the barrel (2) after fitting the first tubular element (5).

In a 73rd aspect according to anyone of the aspects from 65 to 72, said base is configured for receiving a barrel (2) exhibiting:
- a first half extending from a first axial end of the barrel (2) to a maximum or mid cross-section of the barrel (2),
- a second half extending from the maximum or mid cross-section, respectively, of the barrel (2) to a second axial end of the barrel (2), and wherein the control system (122) is configured for:
commanding the guiding element (104) of the fitting group (102) to move along the fitting direction (C) and arranging the first tubular element (5) of the jacket (4) on the barrel (2) so that can cover at least the lateral wall (2*c*) of the barrel (2) first half, and optionally, at least one portion of the lateral wall (2*c*) of the second half of the barrel (2), particularly at least the 10% of the lateral wall (2*c*) of the second half of the barrel (2), commanding the guiding element (110) of the further fitting group (108) to move along the fitting direction (C) and arranging the second tubular element (8) of the jacket (4) on the barrel (2) so that can cover at least the lateral wall (2*c*) of the second half of the barrel (2) and, optionally, at least a portion of the lateral wall (2*c*) of the first half of the barrel (2), particularly by overlapping the first tubular element (5).

In a 74th aspect according to anyone of the aspects from 58 to 73, the apparatus is configured for applying a jacket (4) of a type comprising a first tubular element (5) having at least one base (6) engaged at an end longitudinal portion of the first tubular element (5) in order to define a first shell (7), the guiding element (104) of the fitting group (102) being configured for arranging the first tubular element (5) of the first shell (7) around the barrel (2) lateral wall (2*c*), the base (6) being positioned against the first longitudinal closing portion (2*a*) of the barrel (2).

In a 75th aspect according to the preceding aspect, the fitting group is configured for receiving the first shell (7) in order to arrange the corresponding base (6) directly facing the first longitudinal closing portion (2*b*) of a barrel (2) placed in said horizontal (or vertical, respectively) position and arrange the first tubular element (5) away from the first closing portion (2*a*) of the barrel (2) itself, the guiding element (104) of the fitting group (102) being configured for moving outside the barrel (2) and enabling to turn inside out the first tubular element (5) of the first shell (7) around the base (6) and to arrange such first tubular element on the barrel lateral wall.

In a 76th aspect according to anyone of the aspects from 58 to 75, the apparatus is configured for applying a jacket (4) of a type comprising a second tubular element (8) having at least one base (9) engaged at an end longitudinal portion of the second tubular element (8) in order to define a second shell (10), the guiding element (110) of the further fitting group (108) being configured for arranging the second tubular element (8) of the second shell (10) on the barrel (2) lateral wall (2*c*), the base (6) being placed against the second longitudinal closing portion (2*b*) of the barrel (2).

In a 77th aspect according to the preceding aspect, the further fitting group (108) is configured for receiving the second shell (10) in order to arrange the corresponding base (9) directly facing the second longitudinal closing portion (2*b*) of a barrel (2) placed in said horizontal (or vertical, respectively) position and arranging the second tubular element (8) away from the second closing portion of the same barrel (2), the guiding element (110) of the further fitting group (108) being configured for moving outside the barrel (2) and enabling to turn inside out the second tubular element of the second shell (10) around the base (9) and arranging such second tubular element on the barrel lateral wall.

In a 78th aspect according to anyone of the aspects from 58 to 77, the fitting group (102) comprises:
- at least one fixed structure (112) engaged at the first portion (101*a*) of the base (101),
- at least one actuator (113) engaged to the fixed structure (112) and exhibiting at least one piston (114) movable with respect to this latter at least along a direction parallel to the fitting direction (C) of the frame (103), said piston (114) being horizontally (or vertically, respectively) translatingly movable from a retracted position, wherein the same piston (114) is configured for being spaced from a barrel (2) placed in said horizontal (or vertical, respectively) position, to an advanced position, wherein the piston (114) is configured for being placed in contact with the first longitudinal closing portion (2*a*) of the barrel.

In a 79th aspect according to the preceding aspect, the piston (114) comprises a stem (115) ending with a head (116), the head being configured for contacting the first longitudinal closing portion (2a) of the barrel, wherein—when the first shell is arranged on the fitting group (102)—the head (116) of the piston (114) is configured for positioning the base (6) of the first tubular element (5) at the first longitudinal closing portion (2a) of the barrel (2), and wherein—after positioning the base (6) of the first shell (7) at the first closing portion of the barrel (2)—the guiding element (104) is configured for translating by approaching the piston head (116) and then along the barrel in order to turn inside out the first tubular portion around the corresponding base and then fit the first shell (7) on the barrel (2) lateral wall (2c).

In an 80th aspect according to anyone of the preceding two aspects, wherein the further fitting group (108) comprises:

at least one fixed structure (117) engaged at the second portion (101b) of the base (101),
at least one actuator (118) engaged to the fixed structure (117) and exhibiting at least one piston (119) movable with respect to this latter at least along a direction parallel to the fitting direction (C), said piston (119) being horizontally (or vertically, respectively) translatingly movable from a retracted position, wherein the same piston (119) is configured for being spaced from a barrel (2) placed in said horizontal (or vertical, respectively) position, to an advanced position, wherein the piston (119) is configured for being placed in contact with the second longitudinal closing portion (2b) of the barrel (2).

In an 81st aspect according to the preceding aspect, the piston (119) comprises a stem (120) ending with a head (121), the head (121) being configured for contacting the second longitudinal closing portion (2b) of the barrel (2), wherein—when second first shell (10) is arranged on the fitting group (108)—the piston (119) head of the further fitting group (108) is configured for positioning the base (9) of the further tubular element (8) at the second longitudinal closing portion (2b) of the barrel (2), and wherein—after positioning the base (9) of the second shell (7) at the second longitudinal closing portion (2b) of the barrel (2)—the guiding element (110) of the further fitting group (108) is configured for translating by approaching the head (121) of the piston (119) and then along said barrel in order to turn inside out the second tubular portion around the corresponding base (9) and then in order to fit the second shell (10) on the barrel (2) lateral wall (2c).

In an 82nd aspect according to anyone of the preceding four aspects, the actuator (113) of the fitting group (102) operates in a position radially placed inside the pushers (107) of the guiding element (104) of the fitting group (102) itself.

In an 83rd aspect according to anyone of the preceding five aspects, the actuator (118) of the further fitting group (108) operates in a position radially placed inside the pushers of the guiding element (110) of the further fitting group (108) itself.

In an 84th aspect according to anyone of the preceding six aspects, the actuator (113) of the fitting group (102) and actuator (118) of the further fitting group (108) are configured for translating transversally to the fitting direction (C) substantially along a vertical direction, and wherein said actuators, when arranged in the advanced positions in contact with the respective longitudinal closing portions of the barrel (2), are configured for translating substantially vertically and enabling to raise the barrel (2).

In an 85th aspect according to the preceding aspect, wherein the guiding element (104) of the fitting group (102) and guiding element (110) of the further fitting group (108) are configured for translating along a barrel (2) placed in said horizontal position after raising this latter by the actuators.

In an 86th aspect according to anyone of the aspects from 58 to 85, the apparatus comprises:

at least one forming station configured for obtaining said first shell (7) from a respective first tubular shape precursor body, said forming station having at least one welding unit configured for heat-sealing mutually facing surfaces of the first precursor body in order to form a first welding band (26), and at least one separating unit configured for transversally separating or cutting the first precursor body in order to define said first base (6) at which the first welding band extends, said at least one forming station, or a further distinct forming station, being configured for obtaining said second shell (10) from a respective second tubular shape precursor body, said forming station or said further forming station having at least one welding unit configured for welding mutually facing surfaces of the second forming body in order to form the second welding band (29), and at least one separating unit configured for transversally separating or cutting the second precursor body in order to obtain said second base (9) at which the second welding band (29) extends, said first and second precursor bodies being two distinct tubular bodies or following parts of a same tubular body.

In an 87th aspect according to anyone of the aspects from 58 to 85, the apparatus comprises at least one roll comprising a precursor body in which a plurality of welding bands are preformed placed at regular intervals, and a separating unit of the precursor body configured for transversally separating or cutting the precursor body at the welding bands in order to form discrete portions defining each one of said first and second shells.

In an 88th aspect regarding a process for packaging barrels (2) for alcoholic beverages (B), said process using an apparatus (100) according to anyone of the preceding aspects from 58 to 87. Specifically, the process makes a package according to anyone of the aspects from 1 to 50.

In an 89th aspect according to the preceding aspect, the process comprises at least the following steps:

providing in said horizontal (or vertical, respectively) position at least one barrel (2) of a type comprising a first and second longitudinal closing portions (2a, 2b) opposite to each other, and at least one lateral wall (2c) axially extending between the first and second longitudinal closing portions (2a, 2b) and defining by these latter a compartment (3) for receiving an alcoholic beverage, engaging at least one jacket (4) on the guiding element (104) of the fitting group (102) when this is arranged in the horizontal (or vertical, respectively) position, fitting the jacket (4) on the barrel (2) by advancing the frame (103) of the fitting group (102) along the fitting direction (C), during the fitting step the guiding element (104) of the fitting group (102) horizontally (or vertically, respectively) moving outside the barrel (2) and arranging the jacket (4) carried by the same guiding element (104) around a preponderant part of the barrel (2) lateral wall (2c).

In a 90th aspect according to the preceding aspect, the fitting step provides to move the frame (103) of the fitting group (102) along the base (101) to the respective final position in which at least the guiding element (104) is placed besides the maximum or mid cross-section of the barrel (2).

In a 91st aspect according to anyone of the preceding two aspects, the step of engaging the jacket (4) on the guiding element provides to engage the tubular element (5) around the pushers (107) of the fitting group (102) so that the guiding element (104) of the fitting group (102) can be placed in a circular arrangement substantially countershaped to the external lateral wall (2*c*) of the barrel (2).

In a 92nd aspect according to the preceding aspect, the step of engaging the jacket on the guiding element (104) of the fitting group (102) comprises at least the following steps:
  providing the guiding element (104) of the fitting group (102) in the first operative position,
  engaging the first tubular element (5) of the jacket around the pushers (107),
  providing the guiding element (104) of the fitting group (102) in the second operative condition for tensioning the first tubular element (5) so that the same can be stably engaged with the same guiding element (104), and after tensioning the tubular element, moving the frame (103) of the fitting group (102) from the starting position to the final one for fitting the jacket around the barrel (2).

In a 93rd aspect according to anyone of the preceding four aspects, it is used a jacket (4) comprising a first and second tubular elements (5, 8) distinct from each other, wherein the guiding element (104) of the fitting group (102) engagingly receive the first tubular element (5) of the jacket (4), further the process comprising the following steps:
  engaging the second tubular element (8) on the guiding element (110) of the further fitting group (108) when this is arranged in the starting position,
  fitting the second tubular element (8) on the barrel (2) horizontally (or vertically, respectively) placed by advancing the frame (109) of the further fitting group (108) along the fitting direction (C), during the fitting step the guiding element (110) of the further fitting group (108) horizontally (or vertically, respectively) moving outside the barrel (2) in order to arrange the second tubular element (8) of the jacket, carried by the same guiding element (110), around a preponderant part of the barrel (2) lateral wall (2*c*), the process providing to fit both the first tubular element (5) and the second tubular element (8).

In a 94th aspect according to the preceding aspect, the fitting step provides to move the frame (109) of the further fitting group (102) along the base (101) to the final position of the frame in which at least the guiding element (110) is arranged besides the maximum or mid cross-section of the barrel (2).

In a 95th aspect according to one of the preceding two aspects, the step of engaging the jacket (4) on the guiding element (110) provides to engage the second tubular element (8) around the pushers (111) of the further fitting group (108) so that the element can be placed in a circular arrangement substantially countershaped to the external lateral wall (2*c*) of the barrel (2).

In a 96th aspect according to the preceding aspect, the step of engaging the second tubular element (8) of the jacket (4) on the guiding element (110) of the further fitting group (108) comprises at least the following steps:
  providing the guiding element (110) in the first operative position,
  engaging the further tubular element (8) of the jacket (4) around the pushers (111),
  providing the guiding element (110) in the second operative condition for tensioning the second tubular element (8) so that the same can be stably engaged to the guiding element (110), the movement of the frame (109) of the further fitting group (108) from the starting position to the final one for fitting the second tubular element (8) on the barrel (2), being performed after tensioning the same second tubular element by the guiding element (110).

In a 97th aspect according to anyone of the preceding three aspects, the step of fitting the tubular element (8) by the further fitting group (108) is performed after, particularly immediately after fitting the first tubular element (5) by the fitting group (102).

In a 98th aspect according to anyone of the preceding four aspects, the fitting step by the guiding element (104) of the fitting group (102) provides the first tubular element (5) on at least the lateral wall (2*c*) of the first half of the barrel (2) and optionally on a portion of the lateral wall (2*c*) of the second half of the barrel (2), particularly on at least the 10% of the lateral wall (2*c*) of the second half of the barrel (2).

In a 99th aspect according to a preceding aspect, the fitting step by the guiding element (110) of the further fitting group (108) provides the second tubular element (8) of the jacket (4) on at least the lateral wall (2*c*) of the second half of the barrel (2), and optionally, on at least the 10% of the lateral wall (2*c*) of the first half of the barrel (2).

In an 100th aspect according to the preceding aspect, the second tubular element (8) is fitted so that at least partially overlaps the first tubular element (5).

In an 101st aspect according to anyone of the aspects from 88 to 100, the first tubular element (5) of the jacket (4) is of a type comprising at least one base (6) engaged at a longitudinal end portion of the tubular element (5) in order to define a first shell (7), and wherein the fitting step provides to move the guiding element (104) of the fitting group (102) for arranging the first tubular element (5) of the first shell (7) on the barrel (2) lateral wall (2*c*), while the base (6) is positioned against the first longitudinal closing portion (2*a*) of the barrel (2).

In an 102nd aspect according to the preceding aspect, the first shell (7) is engaged to the guiding element (104) of the fitting group, the base (6) facing the first closing portion (2*a*) of the barrel (2) and the first tubular portion extending from the base away from the barrel, during the fitting step the guiding element (104) of the fitting group (102) moving outside the barrel (2) and enabling to turn inside out the first tubular element of the first shell (7) around the corresponding base (6) and placing it on the barrel (2) itself.

In an 103rd aspect according to anyone of the preceding aspects from 88 to 102, the second tubular element (8) of the jacket (4) is of a type comprising at least one base (9) engaged at a longitudinal end portion of the further tubular element (8) in order to define a second shell (10), the fitting step of the second tubular element (8) providing to slide the guiding element (110) of the further fitting group (108) outside the barrel (2) so that the second tubular element of the second shell (10) is arranged on the barrel (2) lateral wall (2*c*) while the base (9) is positioned against the second longitudinal closing portion (2*b*) of the barrel (2).

In an 104th aspect according to the preceding aspect, the second shell (10) is engaged to the guiding element (110) of the further fitting group (108), the base (9) facing the second closing portion (2*b*) of the barrel (2) and the second tubular portion extending from the base (9) away from the barrel, during the fitting step the guiding element (1110) of the fitting group (108) moving outside the barrel (2) and enabling to turn inside out the second tubular element of the second shell (7) around the corresponding base (9) and placing it on the barrel (2) itself.

In an 105th aspect according to anyone of the aspects from 88 to 104, wherein the step of providing the barrel (2) further comprises the following steps:

arranging the actuator (113) of the fitting group in the advanced condition, wherein the piston (114) is in contact with the first longitudinal closing portion of the barrel (2), arranging the actuator (118) of the further fitting group (108) in the advanced condition, wherein the piston (119) is in contact with the second longitudinal closing portion of the barrel (2), in the advanced conditions of both the actuators (113, 118), the barrel (2) being longitudinally constrained.

In an 106th aspect according to the preceding aspect, the step of providing the barrel (2) further provides at least one step of vertically raising the same so that the barrel (2) is vertically spaced from the abutment portion of the base (101), and wherein the raising step is performed by vertically moving the actuators of the fitting group and of the further fitting group, after moving the same to the advanced condition wherein the pistons of said groups are in contact with the respective longitudinal closing portions of the barrel (2).

In an 107th aspect according to the preceding aspect, the jacket (4) fitting step provides to move outside and along the barrel (2) the guiding elements (104, 110) of the fitting group (102) and of the further fitting group (108), respectively, after raising the same barrel (2), particularly at the end of the jacket (4) fitting step the actuators vertically translate downwards in the direction of the base (101) for enabling the covered barrel (2) to abut on the base (101) itself.

In an 108th aspect according to anyone of the aspects from 88 to 107, the jacket (4) providing step provides:

at least one preparing step, for example by extruding a plastic film, to define at least one tubular precursor body, optionally a first and second tubular precursor distinct bodies, of a plastic film, or by unrolling from a roll a longitudinal portion of a preformed tubular precursor body, and at least a step of cutting or separating segments of a predetermined length of the tubular precursor body for defining said jacket (4) of plastic material having a tubular shape, particularly for defining the tubular element (5) and/or the further tubular element (8), particularly wherein the precursor body comprises pre-die cut transversal separating lines for enabling a step of tear separating the precursor body into said predetermined length segments.

In an 109th aspect according to the preceding aspect comprising at least one step of welding for heat-sealing mutually facing surfaces of the precursor body in order to form a welding band (26, 29), the separating or cutting step being configured for transversally separating or cutting the precursor body at the welding band (26, 29) in order to define said base (6, 9) of one of said first end/or second shells.

In an 110th aspect according to the aspect 108, said roll comprises a precursor body in which a plurality of welding bands placed at regular intervals are placed, the separating or cutting step being configured for transversally separating or cutting the precursor body at the welding bands in order to form discrete portions each defining one of said first and second shells, optionally wherein said pre-die cut separating lines extend adjacent and parallelly to the welding bands.

In an 111th aspect according to anyone of the aspects from 88 to 110, the process comprises at least the following steps:

at least one step of gripping the barrel (2) from a storing area, after the gripping step, a step of orienting the barrel (2) so that the same exhibits the first longitudinal closing portion (2a) facing the first end portion (101a) of the base (101), and the second longitudinal closing portion (2b) facing the second end portion (101b) of the base (101), positioning the barrel in said horizontal position in the base (2) (or respectively in said vertical position).

BRIEF DESCRIPTION OF THE DRAWINGS

Some embodiments and some aspects of the invention will be described in the following with reference to the attached drawings, given in an indicative and therefore non limiting way, wherein:

FIG. 3A is a view of a detail of the package in FIG. 3;

Figure 1:
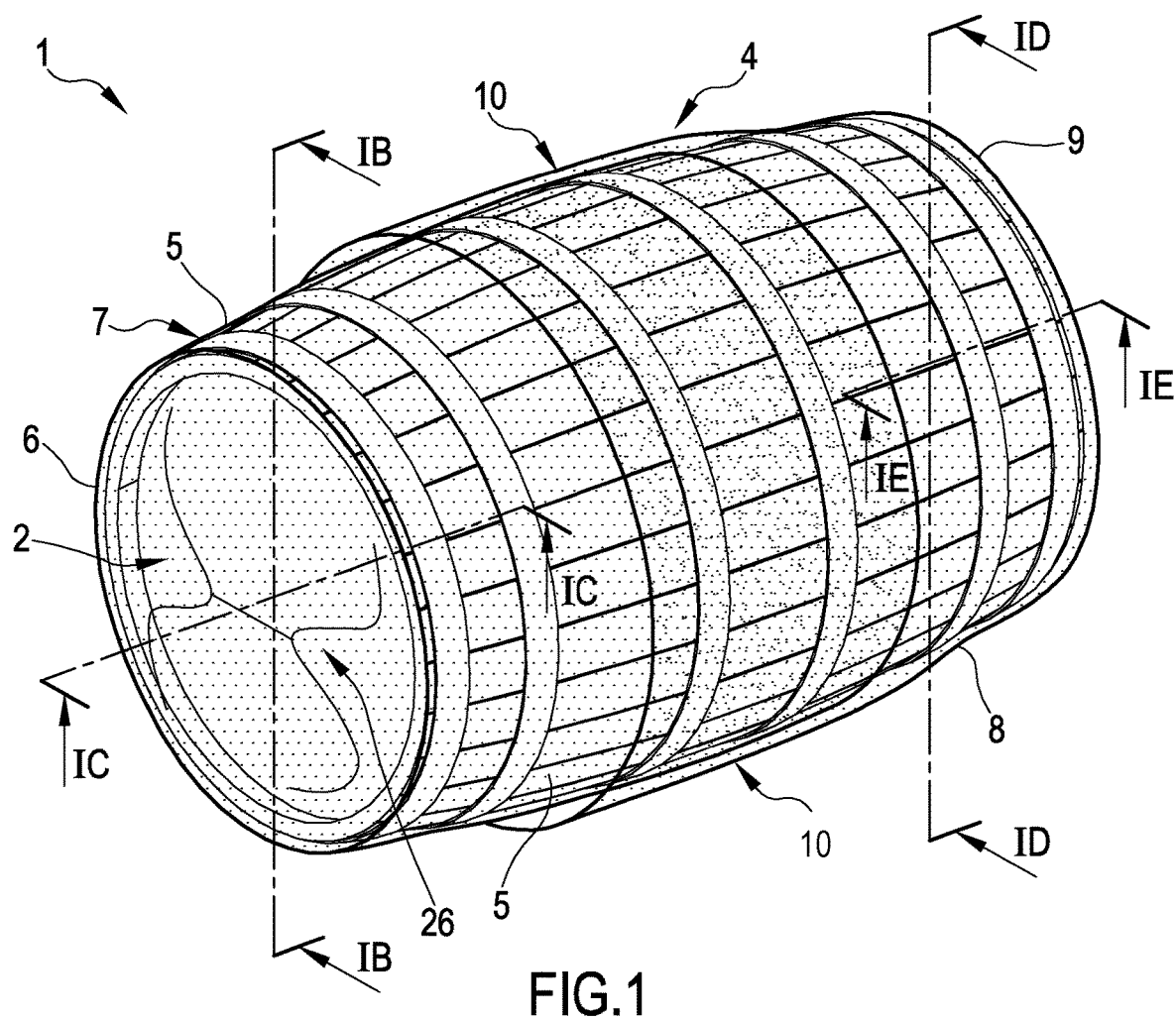
FIG. 1 is a perspective view of a package according to the present invention.

Figures from 6 to 15 are schematic views of an apparatus for making a package according to the present invention; further, Figures from 6 to 15 schematically show the step of a process for making a package according to the present invention.

DEFINITIONS

The terms, as herein used, "oxygen permeability" and "$O_2$ transmission rate" and the acronym "OTR" (oxygen transmission rate) refer all to the rate by which the atmospheric $O_2$ (in other words, gas $O_2$) is transmitted through a film by using a measuring process according to ASTM D3985-05 (2010) e1, which is included in its entirety as a reference. This sometimes is known also as "transmission rate of gas oxygen" by the acronym "O2GTR". The oxygen transmission rate and the gas oxygen transmission rate are both expressed in cubic centimeters to square meter of film per day. Each term "cc/m2 day" and "cc/m2/day" are used for representing "cubic centimeters to square meter of film per day". The measurement is performed under standardized pressure conditions of 1 atm, 23° C., and 0% relative humidity.

As herein used, the term "ethanol permeability" and the acronym "ETR" (ethanol transmission rate) refer to the speed by which the ethanol is transmitted through a film, and it is measured by a cell wherein the film is inserted with an excess of ethanol in the bottom of the cell (below the film), and a nitrogen flow without ethanol continuously wetting the top of the cell (above the film) at a low rate, for example, 10 cc/min of dry nitrogen. The cell has coupling surfaces with a shell arrangement, the film being installed between the contact surfaces so that the volume inside the cell is sealed except the inlet and outlet ports for inserting the nitrogen gas flow. The persons skilled in the field know that this type of arrangement is present in instruments such as Mocon® Ox-Tran® used for measuring the oxygen permeability through a film.

Conceptually, a test cell is used with dry nitrogen made flow through the portion of a chamber above the film. The pressure partial differential between the ethanol high concentration atmosphere below the film and the low ethanol concentration atmosphere above the film causes the ethanol molecules to diffuse through the film to the low concentration atmosphere above the film. Using a flushing gas in the portion of the chamber above the film, keeps the low concentration of ethanol in the atmosphere above the film in order to maintain a constant diffusion rate of the ethanol through the film.

The film acting as a barrier against the ethanol determines the permeation rate of the ethanol, which can be continuously measured by the flow of the nitrogen gas passing through the chamber portion containing the atmosphere above the film. Lastly, a stationary condition is reached in the atmosphere above the film. This stationary condition can require days or weeks for being met. A stationary condition is met when a suitable sensor system used for detecting the ethanol, detects a constant quantity of ethanol in the atmosphere swept outside the upper portion of the chamber. The response is never really constant or unchanging: it just reaches a condition wherein the signal variation as a function of the time is less than a determined threshold. Initially, the signal substantially changes with the time, but at the end it reaches a point wherein Δsignal/Δtime is notably low. In the stationary condition, by definition, the ethanol quantity purged outside the upper portion of the chamber in a given time, exactly corresponds to the ethanol quantity flowing through the film during the same time period. The ethanol quantity flowing through the film in a given time period divided by the film area during a test step supplies the ethanol transmission rate, in other words the ethanol permeability ETR through a determined film area in a determined time period. This permeability ETR can be expressed in terms of ethanol grams to square meter per day (in other words, $g/m^2/day$, expressed also as g/m2 day). The transmission rate can also be normalized as a function of the film thickness, for example $g/100\mu/m2/day$. The sensor system can be provided for sampling the flow purged outside the upper portion of the chamber and by flowing the sample in a test device such as a gas chromatograph provided, for example, with a flame ionization detector (FID). The ethanol is separated from the other emerging components, and then flows through the FID, generating a peak corresponding to an ethanol quantity in the sample. In this way, the ethanol quantity emerging from the upper volume can be determined, and consequently the ethanol film permeability can be measured.

In the present document, the term "water vapor permeability" and the acronym "MVTR" refer to the rate by which the atmospheric moisture is transmitted through a film, measured by the measuring process according to ASTM F1249-06 (2011) e1, which is herein included in its entirety as a reference. The water vapor transmission rate can be expressed by grams to 100 square inches of film per day. Each expression "g/100 in² day" and "g/100 in²/day" represent "grams to 100 square inches of film per day". In the system SI, the used units are "$g/m^2/day$" or "$g/m^2\ day$". The measurement is performed under standardized pressure conditions of 1 atm, 100° F. (37.8° C.), and 100% of relative humidity.

DETAILED DESCRIPTION

Package for Alcoholic Beverages 1 generally indicates a package, for example, for containing—particularly for ageing or maturing—alcoholic beverages B. The alcoholic beverage B cited in the following comprises distilled liquors (whiskey, vodka, rum, tequila, cognac, brandy, for example), or fermented beverages (wine and beer, for example) and also alcoholic beverages containing a mix of liquors and distilled liquors (for example sherry and port wine).

As it is visible for example in FIG. 1, the package 1 comprises at least one barrel or cask 2 made at least partially of wood and defining at least one compartment (FIG. 3) configured for containing a predetermined quantity of an alcoholic beverage B. More particularly as it is visible for example in FIGS. 1-1E, 2 and 3, the barrel 2 comprises a lateral wall 2c, a first longitudinal closing portion 2a and a second longitudinal closing portion 2b; the portions 2a, 2b define axially opposite end closures of the lateral wall 2c: the first and second longitudinal closing portions 2a, 2b cooperatively with the lateral wall 2c delimit the compartment 3. As it is visible in FIGS. 1 and 2 for example, the barrel 2 longitudinally develops between the first and second closing portions 2a, 2b along a longitudinal axis; the accompanying figures illustrate a preferred but non limiting arrangement of the package 1, wherein the barrel 2 develops mainly along the longitudinal axis. However, it is not excluded the possibility of using barrels 2 whose prevalent development is represented by the transversal size (the maximum size defined normal to the longitudinal axis).

As illustrated in the attached figures, the barrel 2 can comprise, in a non limiting way, a plurality of slats crossing a predetermined number of containment crossbars: the slats define the lateral wall 2c of the barrel 2. The closing portions 2a, 2b of the barrel 2 can comprise respective blind stoppers made of wood material adapted to cooperate with the lateral wall 2c for defining said compartment 3.

Figure 1A:
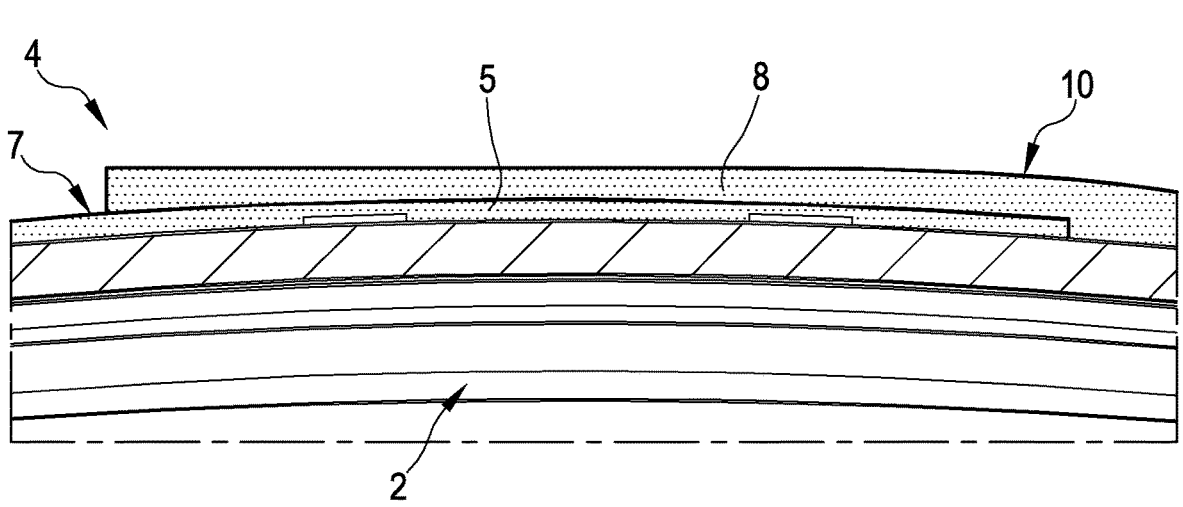
FIG. 1A is a longitudinal cross-section of a detail of a package according to the present invention.
Figure 1B:
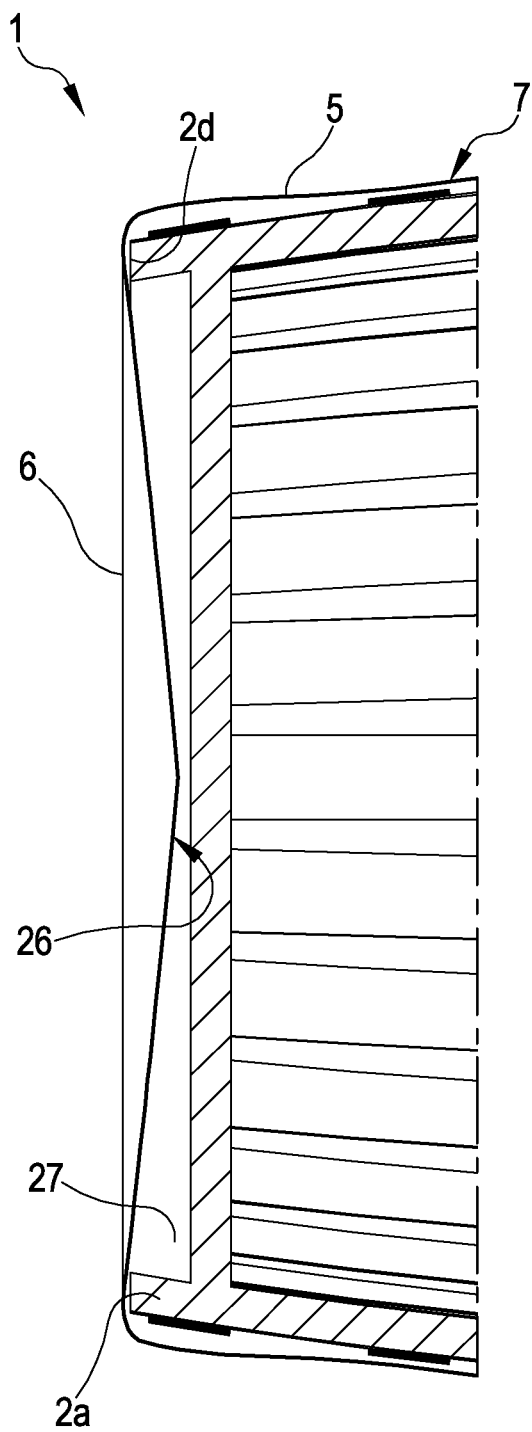
FIG. 1B is a detail of a longitudinal cross-section view of the package in FIG. 1 along the line IB-IB.
Figure 1C:
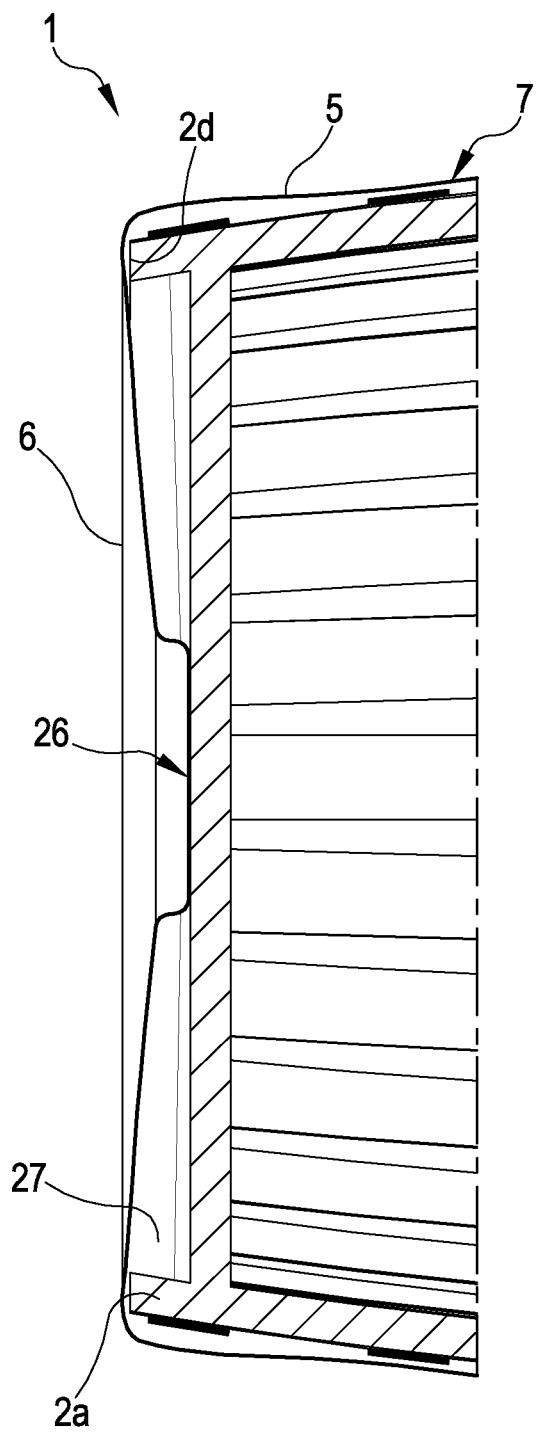
FIG. 1C is a detail of a longitudinal cross-section view of the package in FIG. 1, along the line IC-IC.

As it is visible in FIGS. 1B-1E for example, the lateral wall 2c comprises a first and second end edges 2d, 2f. The first end edge 2d is perimetrally arranged around the first closing portion 2a and defines an axial perimetral projection of the portion 2a itself; particularly, the first edge 2d defines with the external surface of the closing portion, a first compartment 27 delimited by said external surface of the first closing portion 2a and by a radially internal surface of the first end edge 2d (FIGS. 1B and 1C). The second end edge 2f is perimetrally arranged around the second closing portion 2b and axially protrudes from this latter to define a second compartment 28 delimited by an external surface of the second closing portion 2b and by a radially internal surface of the second end edge 2f. De facto, the first and second edges 2d, 2f are the axial/longitudinal ends of the lateral wall 2c, which define also the axial/longitudinal ends of the barrel 2.

Figure 2:
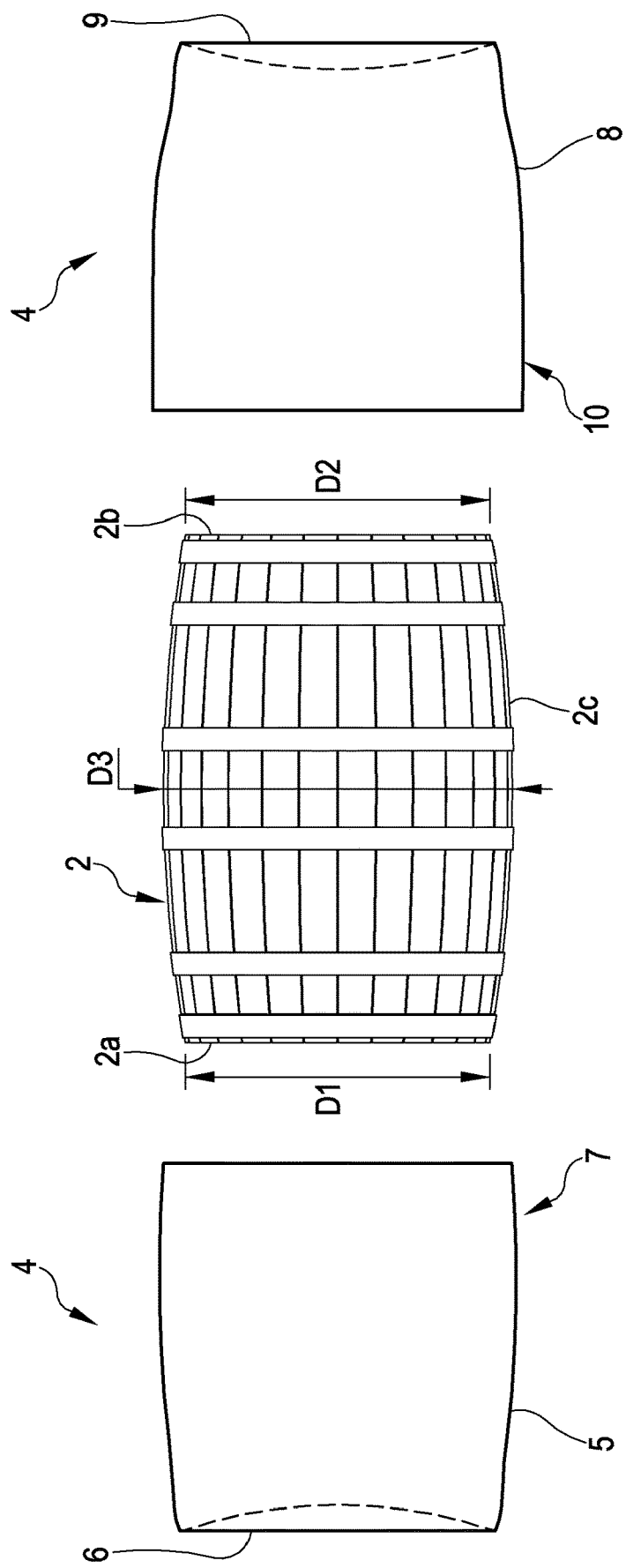
FIG. 2 is an exploded view of a package according to the present invention.

As it is visible in FIG. 2 for example, the barrel 2 exhibits a cross-section having dimensions not constant along all the axial development of the barrel 2 itself. De facto, the lateral wall 2c defines at least one barrel portion 2 exhibiting a maximum cross-section having transversal dimensions or size greater than the other portions of the barrel 2. The attached figures illustrate a preferred non limiting embodiment of the invention wherein the maximum cross-section of the lateral wall 2c-wherein the same wall 2c defines the maximum transversal size of the barrel 2—is defined at a mid portion of the barrel 2. In such arrangement, the lateral wall 2c defines cross-sections of increasing dimensions starting from the first and second end edges 2d, 2f to said mid portion.

Particularly, FIG. 2 illustrates a barrel 2 arrangement wherein the lateral wall 2c exhibits, in a non limiting way, a minimum transversal size at the first and second end edges 2d, 2f (the end edges 2d, 2f substantially exhibit the same minimum transversal size). Particularly, as illustrated in FIG. 2, the first end edge 2d (the first longitudinal closing portion 2a) defines a size D1 substantially equal to the transversal size D2 defined by the second end edge 2f (the second longitudinal closing portion 2b). At the mid portion, the lateral wall 2c defines a transversal size D3 greater than the sizes D1 and D2 respectively defined at the first and second end edges 2d, 2f.

The barrel 2 comprises a first half extending from a first barrel 2 axial end, for example from the first end edge 2d of the lateral wall 2c, to a maximum or mid cross-section of the barrel 2, having a maximum transversal size. The barrel 2 further defines a second half extending from the maximum cross-section or mid cross-section, respectively, of the barrel 2 to a second barrel 2 axial end, for example from the second end edge 2f of the lateral wall 2c.

The attached figures illustrate—in a non limiting way—an arrangement of the barrel 2 having a substantially cylindrical shape. The lateral wall 2c can define a frustoconical tubular element or, as illustrated in FIG. 2, can define a tubular cross-section concave in correspondence of the mid cross-section. In such arrangement (cylindrical barrel 2), the closing portions 2a, 2b define corresponding blind stoppers having a circular shape.

From the dimensional point of view, the barrel 2 exhibits a predetermined length defined by the distance between the first and second end edges 2d, 2f; the length can be for example comprised between 700 and 2,500 mm, particularly between 800 and 2,000 mm. Further, the barrel 2 exhibits a predetermined transversal size—measured normal to the longitudinal axis of the barrel 2 itself —which can be for example comprised between 400 and 1,500 mm, particularly between 400 and 1,200 mm. In the arrangement wherein the barrel has a cylindrical shape, the transversal size is defined by the diameter of the same.

As hereinbefore described, the lateral wall 2c can define a minimum transversal size and a maximum transversal size; the ratio of the transversal maximum size to the minimum transversal size of the barrel 2 can be for example comprised between 1.05 and 1.3, particularly between 1.1 and 1.2. In the configuration wherein the barrel 2 exhibits a circular shape, the maximum size D3 is defined by the maximum diameter of the lateral wall 2c, while the minimum size is defined by the minimum diameter of the lateral wall 2c at the first and/or second end edges 2d, 2f (the minimum sizes are identified with D1 and D2 in FIG. 2).

De facto, the barrel 2 can define an internal volume for example greater than 40 particularly comprised between 200 and 2,000. In an embodiment of the package, the barrel 2 can for example define the so-called "hoghead" having an internal volume of 250-305 l. Other types of useable barrels 2 are, for example: the so-called "butt" (500 l), the American barrel (173-191 l), the quarter barrel (127-159 l) and the eighth barrel (45-63 l). It is useful to remember that the size of the barrel 2 and the ratio volume/internal surface of the same, determine the contacting surface of the alcoholic beverage B with the wood: each above mentioned barrel promotes, in its way, the ageing of the alcoholic beverage B. It is useful to specify that the above cited dimensions are just given for example; in fact, it is not excluded the possibility of using, for the present invention, barrels 2 defining particularly small volumes (for example about 25-30 liters) or particularly large volumes (for example greater than 2,000 liters).

As hereinbefore described, the barrel 2 is structured in order to enable to contain the alcoholic beverage B and due to the contact with the wood of the barrel 2 itself in order to enable to aromatize and age the beverage. The barrel 2 is configured for enabling the oxygen to enter the same for promoting the ageing of the alcoholic beverage B. In a non limiting embodiment of the invention, the barrel 2 can exhibit an oxygen permeability comprised between 10 and 30 $cc/m^2/day$; the barrel 2 permeability depends on the environmental conditions where the barrel 2 is located: for example, the temperature and the level of moisture.

As it is visible in the attached figures, the package 1 comprises at least one jacket 4 of a plastic material film engaged outside the barrel 2: the jacket 4 covers at least a preponderant part of the barrel 2 lateral wall 2c. In a preferred but non limiting embodiment of the invention, the jacket 4 covers at least the 50%, particularly covers at least the 70%, of the barrel 2 lateral wall 2c. In the embodiment illustrated in FIG. 1, the jacket 4 covers, in a non limiting way, the whole barrel 2 lateral wall 2c. It is noted that in a further embodiment, the jacket 4 can cover at least one of the longitudinal closing portions 2a, 2b, and at least part of the lateral wall 2c. In a non limiting advantageous way, the jacket 4 can cover the whole barrel 2 (the lateral wall 2c and both the longitudinal closing portions 2a, 2b as outlined in FIG. 3).

The jacket 4 comprises, in a non limiting way, at least one elastically deformable tubular element (element 5 and/or 8) fitting on said preponderant part of the barrel 2 lateral wall 2c, and exhibiting at least one elastically deformed portion placed with an intimate adhesion to an external surface of the barrel 2 lateral wall 2c. More particularly, the elastically deformed portion of the tubular element, which is placed with an intimate adhesion on the external surface of the barrel lateral wall 2c, contacts at least the 50%, particularly at least the 70% of the total extension of the external surface of the barrel 2 lateral wall 2c.

More specifically, the jacket 4 is configured for switching from an undeformed condition substantially defined before fitting the jacket 4 itself around the barrel 2, to an at least elastically deformed condition wherein the tubular element (elements 5 and/or 8) is fitted at least partially around the barrel 2. The undeformed condition is defined before engaging the jacket 4 around the barrel 2: under such condition, the jacket 4 tubular element exhibits a maximum transversal size greater than the transversal size (D1 and/or D2) defined by the lateral wall 2c at the first and second longitudinal closing portions 2a, 2b and less than the maximum transversal size defined by the lateral wall 2c at the maximum or mid cross-section of the barrel 2.

Under the elastically deformed condition, the jacket 4 tubular element is fitted on the barrel 2 along the longitudinal axis of the barrel 2 lateral wall 2c: under such condition, the transversal size of the tubular element varies along the barrel 2 axis and exhibits a maximum value in correspondence of said maximum or mid cross-section of the barrel 2.

Particularly, the ratio of the transversal size defined by the jacket 4 under the undeformed condition to the size of the lateral wall 2c at the first and/or second longitudinal closing portions 2a, 2b is greater than 1, particularly is comprised between 1.05 and 1.2. Still more particularly, the ratio of the transversal size defined by the jacket 4 under the undeformed condition to the size of the lateral wall 2c at the maximum or mid cross-section of the barrel 2, is greater than 1, particularly is comprised between 0.8 and 0.95.

Figure 3:
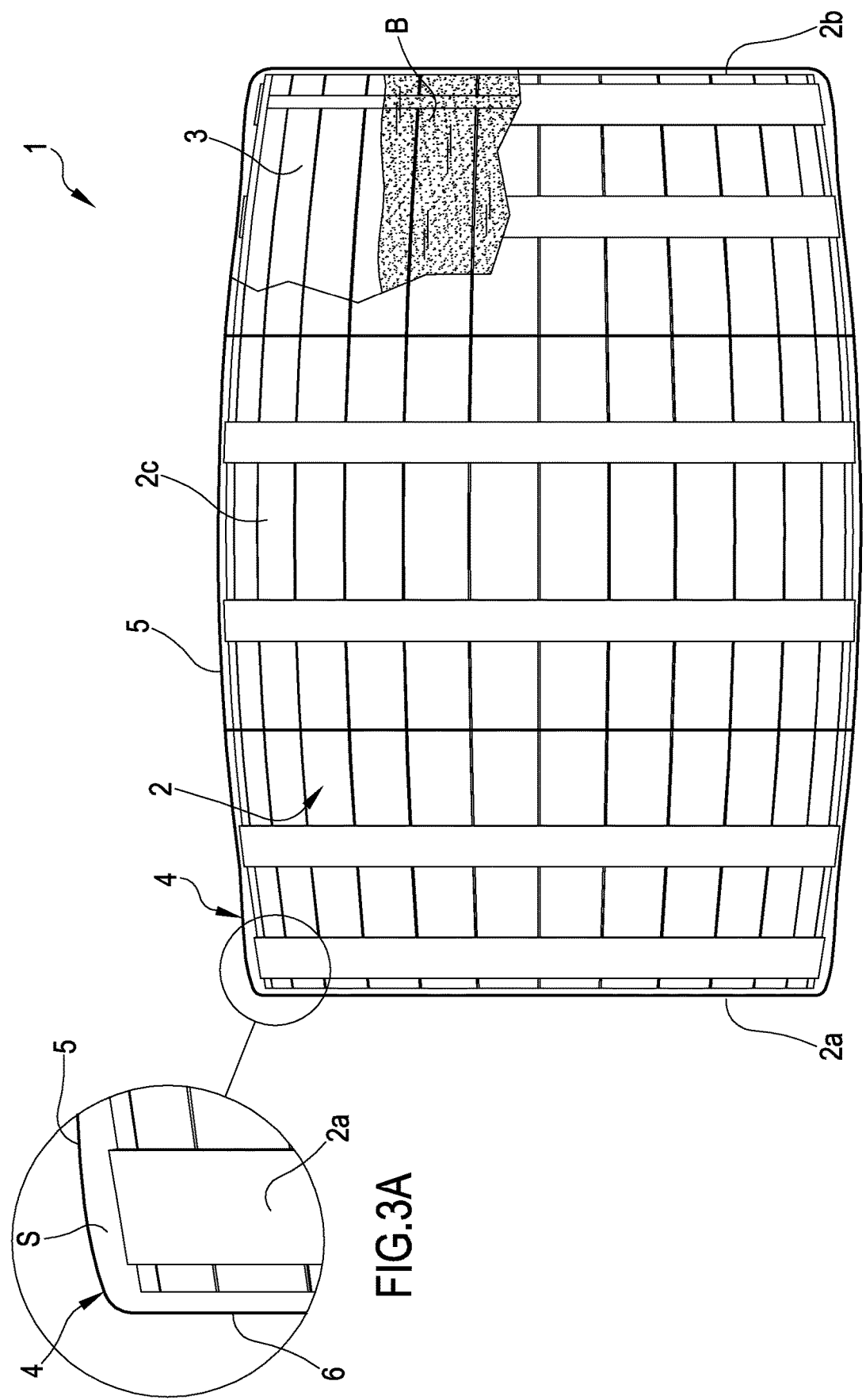
FIG. 3 is a side view of a package in a partial cross-section according to the present invention.

The jacket 4 (or better, the tubular element 5 and/or 8) exhibiting a size greater than the minimum size of the barrel 2, helps fitting the jacket itself around the lateral wall 2c. On the contrary, the jacket 4 (or better the tubular elements 5 and/or 8) exhibits a size less than the barrel 2 maximum size in order to enable an elastic deformation of at least part of the jacket itself which, along at least part of its longitudinal extension, will be intimately adhere to the lateral wall 2c. This condition is illustrated in FIG. 3 wherein it is possible to observe a part of the jacket intimately adhering to the lateral wall 2c and a loosely covering part (portions of the jacket at the portions 2a and 2b) (there is no deformation of the film —jacket); de facto, at the portions 2a and 2b, the jacket is slightly spaced from the lateral wall 2c and forms with this latter a gap S (FIG. 3A).

Advantageously, but not in a non-limiting way, the jacket 4 exhibits a shape countershaped at least to the barrel 2 lateral wall 2c. More particularly, the jacket 4, under the undeformed condition, is adapted to define a shape substantially countershaped to the barrel 2 lateral wall.

The attached figures illustrate an embodiment of the package 1 wherein the barrel 2 defines a substantially cylindrical shape; in such arrangement, also the jacket is adapted to define, also in the undeformed condition, a substantially cylindrical tubular shape. In this latter described arrangement, the transversal size of the jacket 4 is defined by the diameter. De facto, in this latter described arrangement (the barrel and the substantially circular cross-section jacket), the jacket 4 tubular element exhibits, under the undeformed condition, a substantially cylindrical shape having a diameter greater than the diameter defined by the lateral wall 2c at the first and second longitudinal closing portions (2a, 2b) and less than the diameter defined by the lateral wall 2c at the maximum or mid cross-section of the barrel 2; under the at least elastically deformed condition, the jacket 4 tubular element is fitted on the barrel 2 and exhibits a diameter varying along the longitudinal axis of the barrel 2 lateral wall 2c: the varying diameter has a maximum value at said maximum or mid cross-section of the barrel 2.

In the embodiment wherein the barrel 2 exhibits a cylindrical shape, the ratio of the diameter defined by the jacket 4 under an undeformed condition to the diameter of the lateral wall 2c at the first and/or second longitudinal closing portions 2a, 2b is greater than 1, particularly is comprised between 1.05 and 1.2. Moreover, the ratio of the diameter defined by the jacket 4 under an undeformed condition to the diameter of the lateral wall 2c at the maximum or mid cross-section of the barrel 2 is less than 1, particularly is comprised between 0.8 and 0.95.

In an embodiment not illustrated in the attached figures, the jacket 4 can comprise just one tubular element —particularly at least partially deformable —adapted to cover at least the 50% of the barrel 2 lateral wall 2c. In a variant of the embodiment, the jacket 4 can comprise just one tubular element —particularly at least partially deformable —adapted to cover at least the 50% of the barrel 2 lateral wall 2c and at least a longitudinal closing portion of this latter.

As shown in FIG. 1 for example, the jacket 4 can comprise at least one first elastically deformable tubular element 5 fitted on the lateral wall 2c of the first half of the barrel 2 and exhibiting at least one respective elastically deformed portion placed with an intimate adhesion to at least part of an external surface of the lateral wall 2c of the first half of the barrel 2. Advantageously, but in a non-limiting way, the first tubular element 5 can be fitted around the barrel 2 so that the same element 5 can cover the lateral wall 2c of the first half of the barrel 2 and at least part of the lateral wall 2c of the second half of the barrel 2, particularly the first tubular element 5 wraps at least the 10% of the lateral wall 2c of the second half of the barrel 2. Optionally, the elastically deformed portion of the first tubular element 5 extends longitudinally at least along the 50%, particularly at least along the 70%, of the axial extension of the lateral wall 2c of the first half of the barrel 2. More particularly, the elastically deformed portion of the first tubular element 5 comprises all or at least a part of the terminal strip of the first tubular element 5.

The first tubular element 5 extends between a first and second end edges; the first element 5 can comprise a tubular body defining inside a through channel between the first and second end edges. In such arrangement—not illustrated in the attached figures—the first tubular element 5 does not have longitudinal closing portions.

On the contrary, as illustrated in FIGS. 1 and 1B for example, the first tubular element 5 of the jacket can exhibit a base 6 terminally joined to the first tubular element 5. In such arrangement, the first tubular element 5 exhibits, at the first end edge, said base 6 longitudinally closing said element 5. The first tubular element 5 and base 6 define a first shell 7 (for example visible in FIGS. 1, 1B, 1C, 2) adapted to cover at least partially the barrel 2.

The base 6 is placed at the first longitudinal closing portion 2a of the barrel 2, while the first tubular element 5 wraps at least partially the lateral wall 2c of the first half of the barrel 2. Advantageously, but not in a limiting way, the first tubular element 5 and first base 6 of the first shell 7 are integrally joined in order to define a single body.

The first shell 7 can be obtained starting from a respective first tubular shape precursor body welded on itself in order to define said first base in correspondence of which a first welding band 26 is formed (see FIGS. 1-1C, 1F, 1G, for example).

Figure 4:
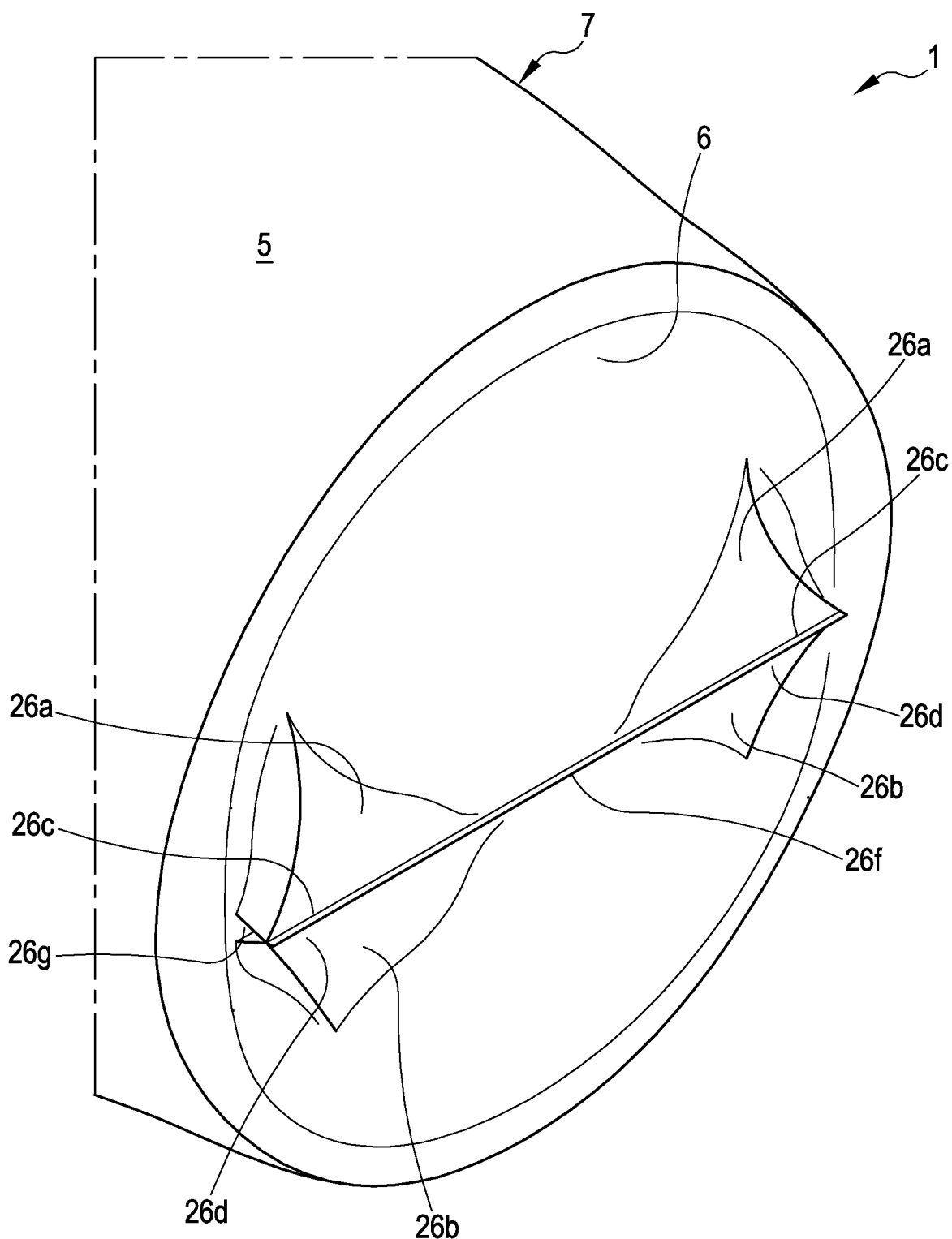
FIG. 4 is a perspective view of a detail of a jacket of a package according to the present invention.

As it is visible in FIG. 4 for example, the first welding band 26 comprises a pair of lips 26a, 26b emerging from said first base 6 and welded to each other in correspondence of mutually facing surfaces; the band 26, on each side of said lips 26a, 26b, exhibits a respective strip 26c, 26d retracting towards a central area 26f of the band 26 itself. The terminal portions of said lips 26a, 26b and said strips 26c, 26d define—on each side of the first welding band—cooperatively with said first base—a respective connection bellows 26g, 26h (FIG. 5). Generally, it is observed that the lips 26a, 26b and strips 26c, 26d retracting on each side towards a central area 26f of the welding band 26 are reciprocally welded to each other along the reciprocal contact surfaces in order to define a continuous weld forming, with the first base 6, said bellows which is substantially placed in a plane transversal to the base itself. FIG. 4B schematically shows the first welding band 26; along such front view, the band 26 looks as a single welded rectilinear segment extending less than the transversal size of the tubular element 5. De facto, folding and then welding the tubular element 5 in order to define said welding band 26 enables the same to define a maximum size less than the (minimum or maximum) transversal size of the jacket 4. On the contrary, FIG. 4C outlines a portion of the band 26 interposed between the base 6 and welded portion of the band 26 itself. Such outline in fact shows the folded arrangement of the tubular element in the unwelded area: such folding enables to reduce the band 26 size in the welded area immediately placed downstream the exclusively folded area. Instead, FIG. 4D illustrates the arrangement of the band 26 in the welding area placed downstream the folding area shown in FIG. 4C.

The first shell 7, as illustrated in FIG. 4 for example, is fitted on the barrel 2 from the first end portion 2a and is turned inside out in order to arrange said first welding band 26 in a position emerging from the first base 6 and extending towards the interior of the first shell 7. As it will be better described in the following, the shell 7 base 6 is placed at the first closing portion 2a, the tubular element 5 facing away from the barrel 2: then the tubular element 5 is turned inside out on the barrel 2 so that the base 6 is always placed at the first closing portion 2a, while the tubular element 5 is placed around the lateral wall 2c as hereinbefore described. In this way, the welding band 26 is placed inside the recess 27 as outlined in FIGS. 1B and 1C: the welding band 26 faces the closing portion 2a and substantially inside the projection defined by the first end edge 2s (FIGS. 1B and 1C).

In the embodiment illustrated in the attached figures, the jacket 4 comprises, in a non limiting way, the first tubular element 5 and a second tubular element 8 which is also elastically deformable, fitted on the lateral wall 2c of the second half of the barrel 2, and exhibiting at least one respective elastically deformed portion placed with an intimate adhesion on at least part of an external surface of the lateral wall 2c of the first half of the barrel 2.

Advantageously but in a non limiting way, the second tubular element 8 can be fitted around the barrel 2 so that the same element 8 can cover the lateral wall 2c of the second half of the barrel 2 and at least part of the lateral wall 2c of the first half of the barrel 2, particularly the second tubular element 8 wraps at least the 10% of the lateral wall 2c of the first half of the barrel 2. Optionally, the elastically deformed portion of the second tubular element 8 longitudinally extends at least along the 50%, particularly at least along the 70%, of the axial extension of the lateral wall 2c of the second half of the barrel 2. More particularly, the elastically deformed portion of the second tubular element 8 comprises all, or at least part of the terminal strip of the second tubular element 8.

Advantageously, but in a non limiting way, at least one terminal strip of the second tubular element 8 overlaps a terminal strip of the first tubular element 5, defining an overlapping area having an axial extension comprised between 5 and 25% of the axial extension of the barrel 2 lateral wall 2c; preferably, the overlapping area extends at a central longitudinal area of the barrel 2 lateral wall 2c, particularly at the portion where the barrel 2 exhibits the maximum transversal size (for example at the portion where the barrel 2 defines the maximum diameter).

The second tubular element 8 extends between a first and second end edges; the second element 8 can comprise a tubular body defining inside a through channel between the first and second end edges. In such arrangement—not illustrated in the attached figures—the second tubular element 8 does not have longitudinal closing portions.

Figure 1D:
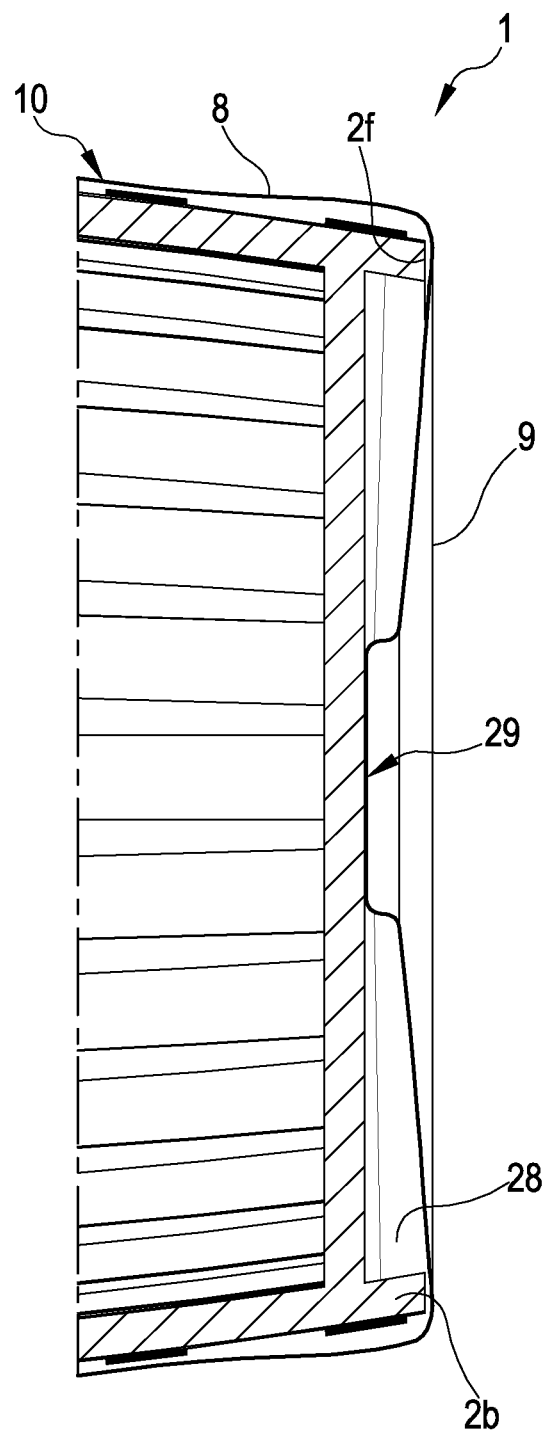
FIG. 1D is a detail of a longitudinal cross-section view of the package in FIG. 1 along the line ID-ID.

On the contrary, as illustrated in FIGS. 1 and 1D for example, the second tubular element 8 of the jacket can exhibit a base 9 terminally joined to the second tubular element 8. In such arrangement, the second tubular element 8 exhibits, at the first end edge, said base 9 longitudinally closing said element 8. The second tubular element 8 and base 9 define a second shell 10 (visible in FIGS. 1, 1D, 1E, 2, for example) adapted to cover at least partially the barrel 2.

The base 9 is placed at the second longitudinal closing portion 2b of the barrel 2, while the second tubular element 8 wraps at least part of the lateral wall 2c of the second half of the barrel 2. Advantageously but in a non-limiting way, the second tubular element 8 and base 9 of the second shell 10 are integrally joined in order to define a single body.

Figure 1E:
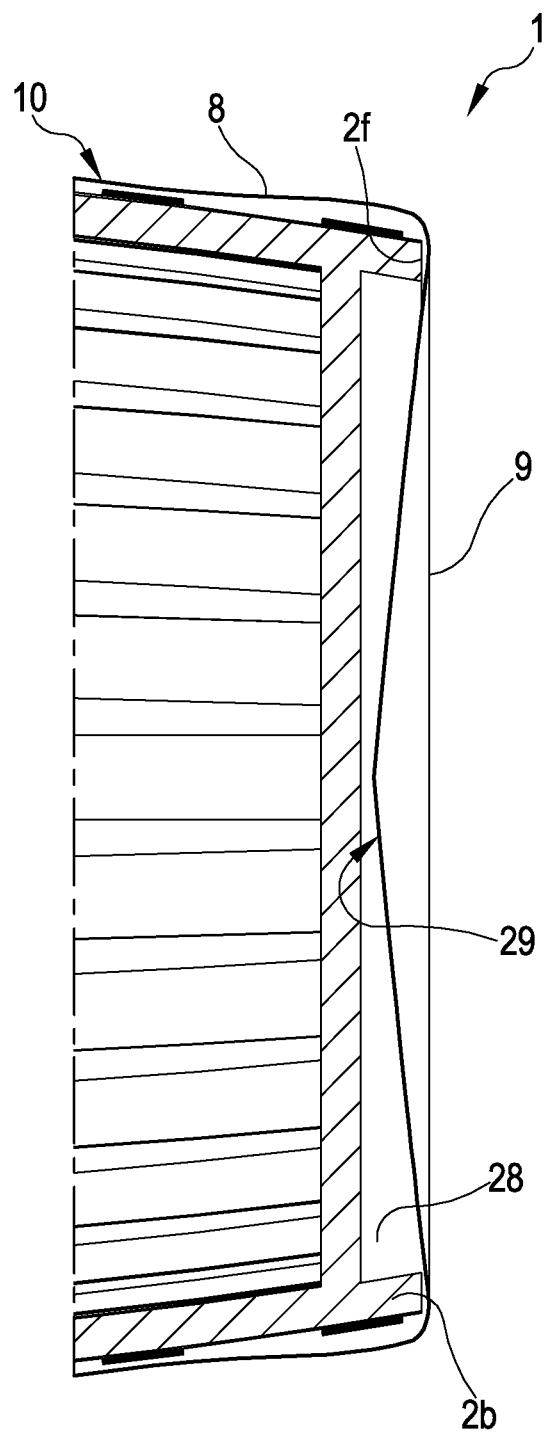
FIG. 1E is a detail of a longitudinal cross-section view of the package in FIG. 1 along the line IE-IE.
Figure 1F:
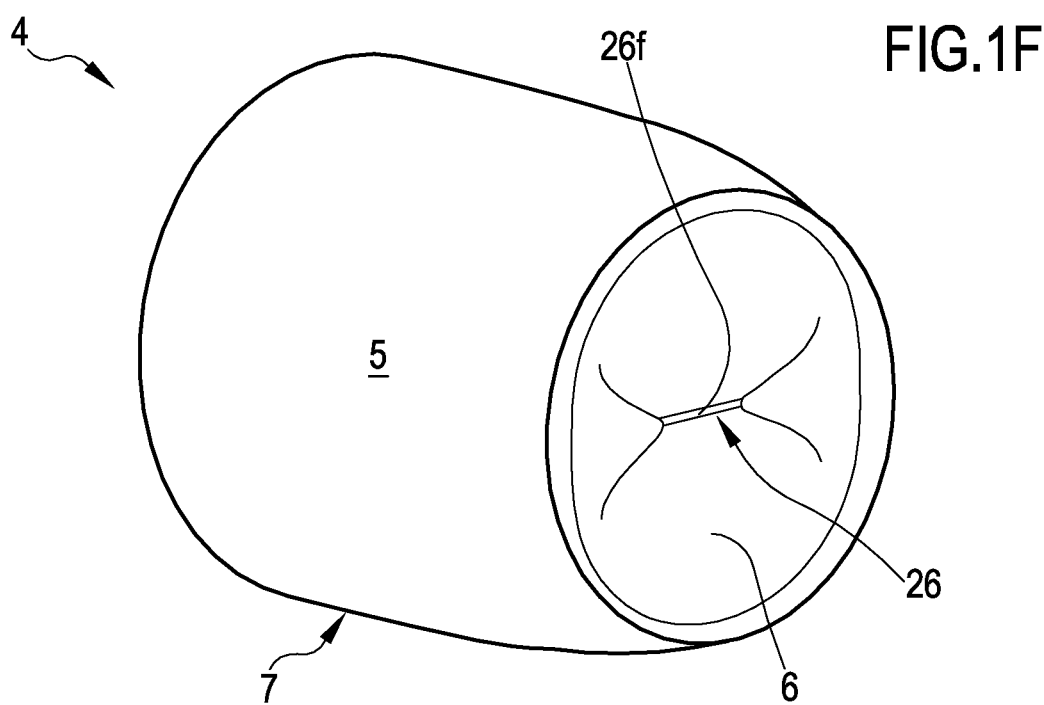
FIG. 1F is a perspective view of a jacket of the package according to the present invention.
Figure 1G:
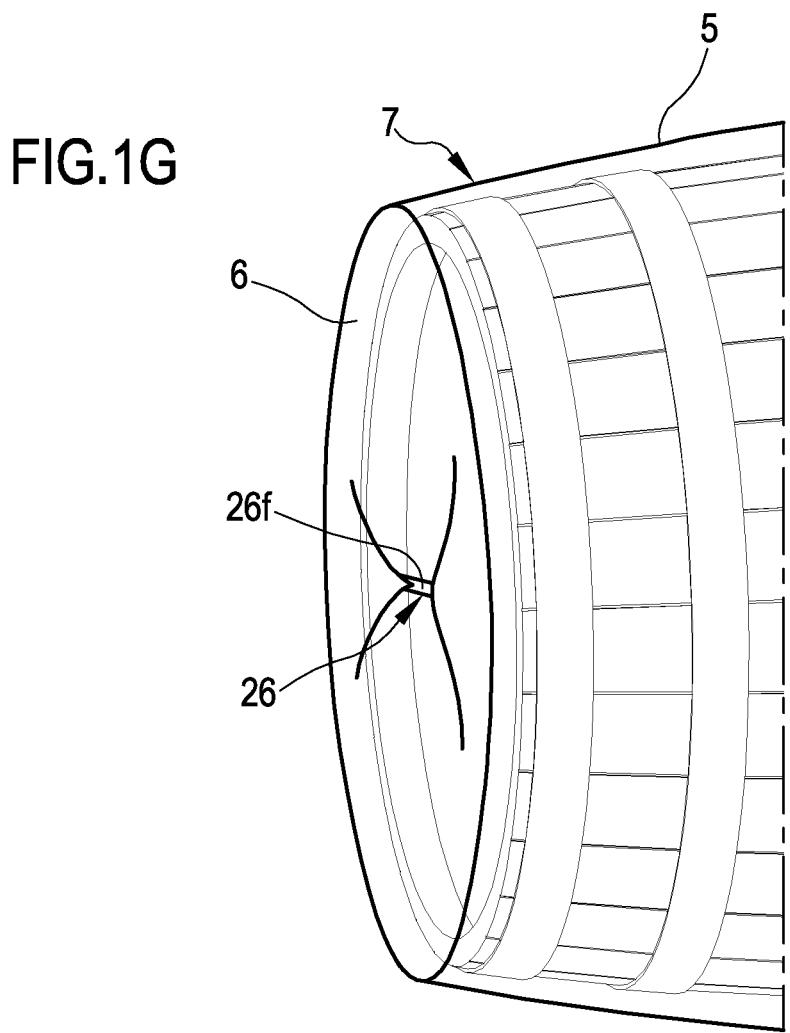
FIG. 1G is a perspective view of a detail of a package according to the present invention.
Figure 4A:
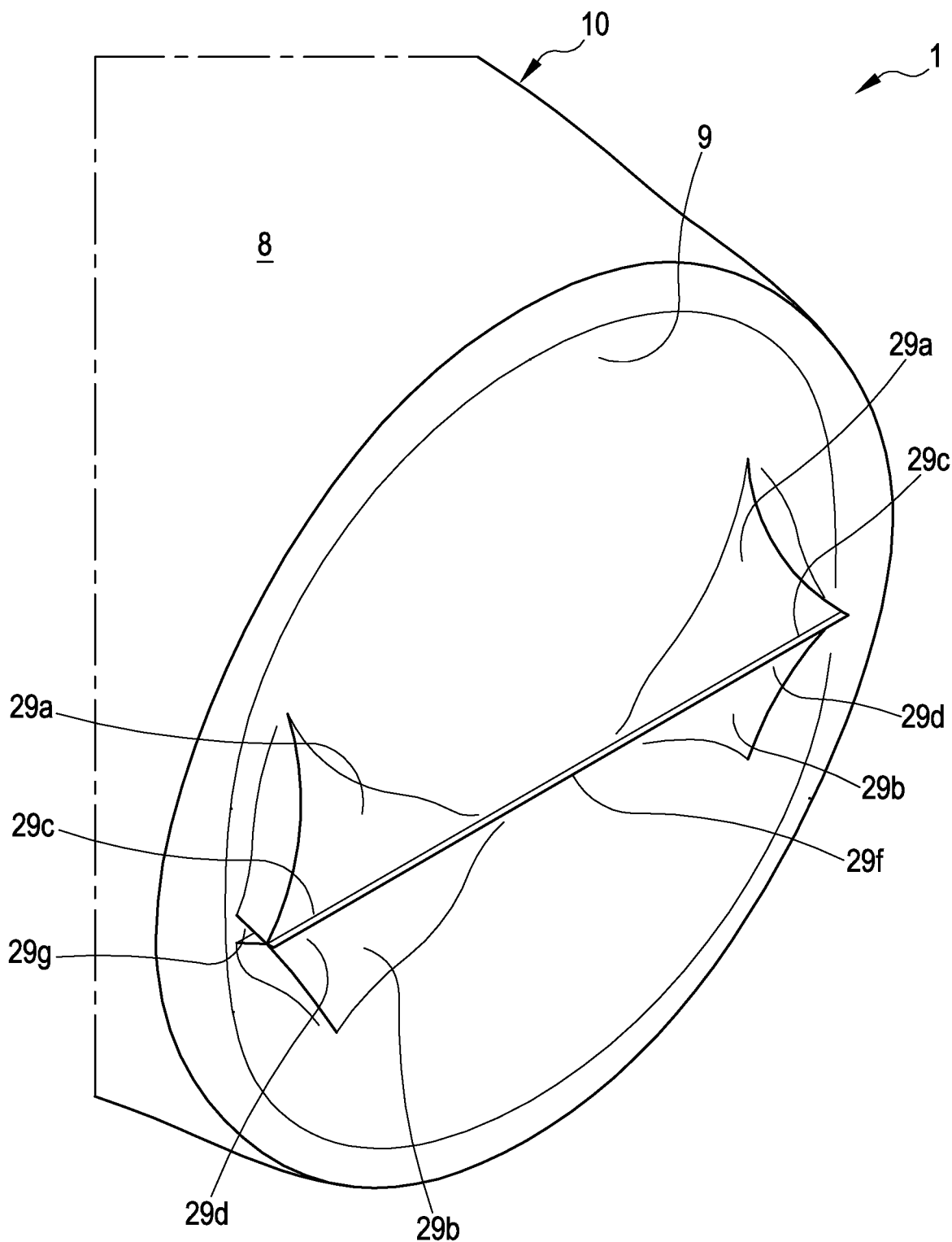
FIG. 4A is a perspective view of a detail of a further jacket of a package according to the present invention.
Figure 4B:
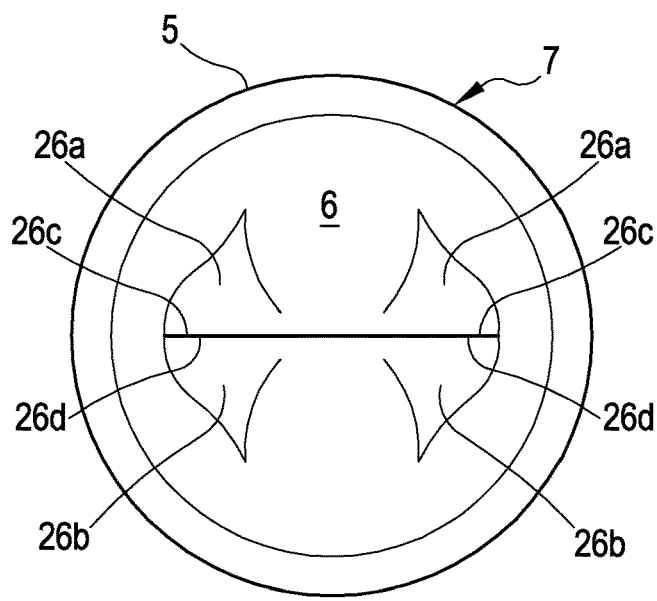
FIG. 4B is a front view of the jacket in FIG. 4.

The second shell 10 can be obtained starting from a respective second tubular shape precursor body welded on itself in order to define said base, at which a second welding band 9 is formed (see FIGS. 1D, 1E and 4A, for example).

As it is visible in FIG. 4A for example, the second welding band 29 comprises a pair of lips 29a, 29b emerging from said base 9 and welded to each other at mutually facing surfaces; the band 9, on each side of said lips 29a, 29b, exhibits a respective strip 29c, 29d retracting towards a central area 29f of the welding band 29. The terminal portions of said lips 29a, 29b and said strips 29c, 29d define—on each side of the second welding band—cooperatively with said base 9—a respective connection bellows. FIG. 4A outlines only the bellows 29g defined by the lips 29a and 29b; oppositely, the lips 29c and 29d will define a corresponding bellows (not illustrated in the attached figures): in such arrangement, the second tubular element 8 defines lateral bellows as shown in FIG. 5 for the first tubular element 5.

Figure 4C:
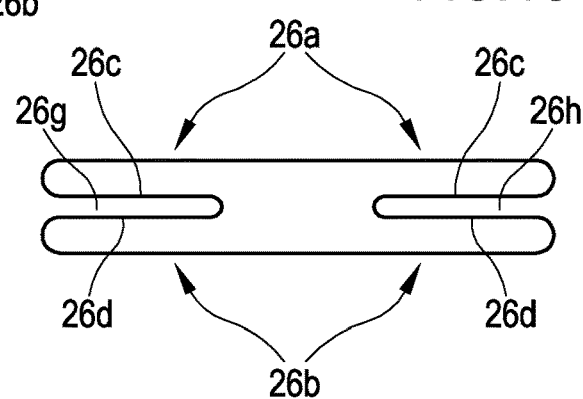
FIGS. 4C and 4D are respective schematic views of the jacket in FIG. 4.
Figure 4D:
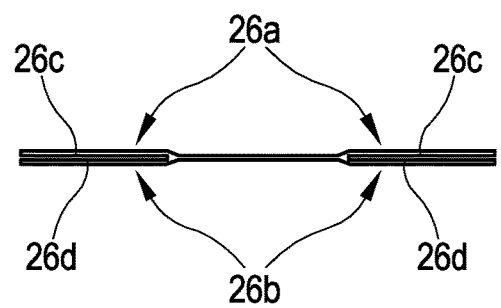
Figure 5:
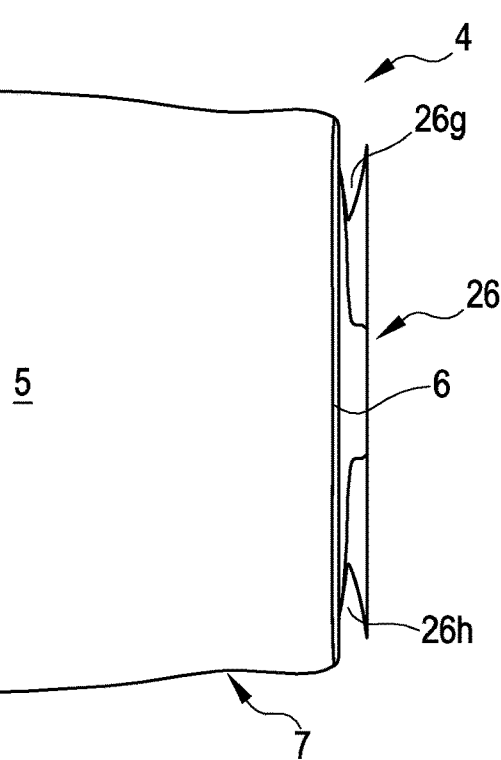
FIG. 5 is a side view of a jacket of the package according to the present invention.

FIGS. 4B-4D illustrate only the arrangements of the first welding band 26; it is noted that the second welding band 29 exhibits the same arrangement of the band 26. De facto, also the second welding band 29 —along a front view—looks as a single rectilinear welded segment extending less than the transversal size of the tubular element 8. De facto, folding and then welding the tubular element 8 in order to define said welding band 29 enable the same to define a maximum size less than the (minimum or maximum) size of the jacket 4. As for the first band 26, also the second welding band is interposed between the base 9 and the welded portion of the band 29 itself.

The second shell 10, as illustrated in FIG. 4A for example, is fitted on the barrel 2 from the second end portion 2b and is turned inside out in order to arrange said welding band 9 in a position emerging from the base 9 and extending towards the interior of the second shell 10. As it will be better described in the following, the shell 10 base is placed at the second closing portion 2b, the tubular element 9 facing away from the barrel 2: then the tubular element 8 is turned inside out on the barrel 2 so that the base 9 is always placed at the second closing portion 2b, while the tubular element 8 is arranged around the lateral wall 2c as hereinbefore described. In this way, the welding band 29 is placed inside the recess 28 as outlined in FIGS. 1D and 1E: the welding band 29 faces the closing portion 2b and substantially inside the projection defined by the second end edge 2f (FIGS. 1D and 1E).

The attached figures illustrate a preferred but non limiting arrangement of the invention wherein the jacket comprises both the first and second shells 7, 10 covering at least the 90%, preferably the 100%, of the external surface of the barrel 2. In such preferred arrangement, the first and second shells 7, 10 are axially opposite to each other: the first shell 7 covers the first longitudinal closing portion 2a and at least the first half of the barrel 2, while the second shell 10 covers the second longitudinal closing portion 2b and at least the second half of the half of the barrel 2.

From the structural point of view, the film defining the jacket 4 can comprise a multilayer film exhibiting at least one ethanol barrier layer. As hereinbefore described, the jacket 4 exhibits an elastically deformable structure, particularly the film can exhibit an elongation at break equal at least to 500%, and an elastic recovery equal to at least 10%.

From the dimensional point of view, the film (more generally the jacket 4) can exhibit a thickness comprised between 0.01 and 2 mm, particularly between 0.05 and 1 mm, still more particularly between 0.05 and 0.2 mm. Advantageously but in a non limiting way, said multilayer film can comprise: an internal layer as an ethanol barrier layer film, a first external layer defining an external surface of the package, and a second external layer opposite to the first external layer and active as a heat-sealable layer; the ethanol barrier internal layer is interposed between the first and second external layers and can comprise a cyclic olefin polymer, COP, or a cyclic olefin copolymer, COC.

Process for Making a Packaged Barrel

Further, the invention refers to a process for making a packaged barrel 2 by using a package 1 according to the above discussed description, and, particularly, according to anyone of the attached package 1 claims.

The process comprises a step of providing at least one barrel 2; before closing the compartment 3, a predetermined quantity of an alcoholic beverage B is introduced inside the barrel 2. After the step of providing the barrel 2, the same is placed, in a non limiting way, horizontally: the longitudinal axis extends along a substantially horizontal development plane.

Moreover, the process comprises the provision of the jacket 4. The jacket 4 can be made by extruding a tubular shape plastic film, particularly a circular one. After forming a tubular body, this is cut to define a tubular element (elements 5 and/or 8). When the jacket 4 comprises only an open tubular body (an element defining inside a through open channel), this latter is fitted around the barrel 2 so that it can cover at least part of the lateral wall 2c (this condition is not illustrated in the attached figures). The step of fitting the tubular element (elements 5 and/or 8) of the jacket 4 on the barrel 2 lateral wall 2c makes the same jacket 4 to be wrapped externally at least a preponderant part of the barrel 2 external surface. As hereinbefore described, the jacket 4 comprises, advantageously but in a non limiting way, and elastically deformable tubular element: under such condition, the fitting step comprises radially elastically deforming at least part of the tubular element (elements 5 and/or 8) so that at least the elastically deformed part is placed with an intimate adhesion on the barrel 2 lateral wall 2c.

However, in a preferred but non limiting embodiment of the invention, the jacket 4 arrangement provides, after extruding the film into a tubular shape, cutting the same at a predetermined length in order to define a first tubular shape precursor body which is then folded at an end and then welded (welding mutually facing surfaces of the first precursor body in order to form the first welding band 26) on itself in order to define said base 6.

Particularly, after forming the first tubular precursor body, the same is welded in correspondence of an end to define the welding band 26: the first precursor body therefore defines the first shell 7.

In case the jacket 4 comprises only one shell (for example only the first shell 7), after forming this latter, the base 6 is placed on the first closing portion 2a (as outlined in FIG. 8, for example), while the tubular element (the element 5, for example) is placed oppositely the barrel 2: the tubular element (the element 5, for example) extends from the base 7 oppositely the barrel 2. It is noted that, in such arrangement, the welding band 26 faces the closing portion 2a, and, particularly, is arranged inside the recess 27 (FIGS. 1B and 1C).

Thereafter, the first shell 7 is turned inside out (this step is outlined in FIG. 10) so that the tubular element 5 can wrap at least part of the lateral wall 2c as hereinbefore described with reference to the package 1. Particularly, the first shell 7 is turned inside out in order to arrange said first welding band 26 in a position emerging from said first base 6—extending towards the interior of the first shell 7—and housed in said first compartment 27.

The step of turning inside out the tubular element 5 enables to elastically deform at least part of said element so that the same can at least partially intimately adhering to the lateral wall 2c as hereinbefore described with reference to the package 1. In the condition wherein the jacket 4 comprises both the tubular element 5 and base 6 (the jacket formed by a shell), the jacket 4 wraps outside at least a preponderant part of the barrel 2 external surface at at least one closing portion (in case of the first shell 7, at least said first closing portion 2a). Also in this case, the fitting step comprises elastically radially deforming at least part of the tubular element (the element 5, for example) so that at least the elastically deformed part is placed with an intimate adhesion to the barrel 2 lateral wall 2c.

As hereinbefore described, the jacket 4 can advantageously comprise the first and second shells 7, 10. Under such condition, the step of providing the jacket 4 provides forming—for example by extruding a plastic tubular film—a first tubular body which is cut at a predetermined length for forming the first precursor body: then, the first precursor body is folded and welded at an axial end to define the first welding band 26 and then the first shell 7. The step of providing the jacket 4 further provides forming—for example by extruding a tubular plastic film—a second tubular body which is cut at a predetermined length for forming the second precursor body: then the second precursor body is folded and welded at an axial end to form the second welding band 29 and therefore the second shell 10.

It is useful to specify that the first and second shells 7, 10 can be obtained starting from two distinct precursor bodies (bodies which are distinctly cut, folded, and welded) or can be obtained starting from a single precursor body. In this latter arrangement, the process provides to extrude a single tubular body which is then cut at a predetermined length; such tubular body is then folded and welded at a substantially central portion of the tubular body. Then or simultaneously with the welding step, the tubular body is cut at the welded area so that the single body can be divided into the first and second shells 7, 10.

In case the jacket 4 is defined by the shells 7 and 10, these latter are placed on the barrel 2 with the respective welding bands 26 and 29 facing the first and second closing portions 2a, 2b. The first welding band 26 faces and is placed inside the recess 27, while the second welding band 29 faces and is placed inside the recess 28 (this condition is outlined for example in FIG. 8).

Afterwards, the first shell 7 is turned inside out (this step is outlined in FIG. 10) so that the tubular element 5 can wrap at least partially the lateral wall 2c as hereinbefore described with reference to the package 1. Specifically, the first shell 7 is turned inside out, in order to arrange said first welding band in a position emerging from said first base 6 —extending towards the interior of the first shell 7—and housed in said first compartment 27. The tubular element 5 wraps outside at least a preponderant part of the barrel 2 external surface while a base 6 is placed at the first closing portion 2a. Also in this case, the fitting step comprises radially elastically deforming at least part of the tubular element 5 so that at least the elastically deformed part is positioned with an intimate adhesion to the barrel 2 lateral wall 2c.

Afterwards or simultaneously with the step of turning inside out the shell 7, the process provides to turn inside out the second shell 10 (this step is outlined in FIG. 12), so that the tubular element 8 can wrap at least partially the lateral wall 2c as hereinbefore described with reference to the package 1. Particularly, the second shell 10 is turned inside out in order to arrange said first welding band 29 in a position emerging from said base 9—extending towards the interior of the second shell 10—and housed in said second compartment 28. The tubular element 8 externally wraps at least a preponderant part of the barrel 2 external surface while the base 2 is placed at the second closing portion 2b. Also in this case, the fitting step comprises to radially elastically deform at least part of the tubular element 8 so that at least the elastically deformed part is positioned with an intimate adhesion on the barrel 2 lateral wall 2c.

As hereinbefore described, the barrel 2 is placed, in a non limiting way, in a horizontal position; in such arrangement, the process for helping fit the jacket 4, can provide a step of raising the barrel 2 (this step is outlined in FIG. 9, for example) for example from the closing portions 2a, 2b: raising the barrel 2 enables to loosen the entire lateral surface 2c in order to easily fit (for example by turning inside out) the jacket 4 around the barrel 2.

In an alternative arrangement of the process, the barrel 2 can be vertically positioned: the barrel 2 longitudinal axis develops substantially along a vertical direction. De facto, in such arrangement, the barrel 2 can abut on the first or second closing portions 2a, 2b: in this way, the lateral wall 2c is completely loose and the jacket 4 is fitted along a vertical direction. Still referring to the process of vertically fitting the barrel 2, it is possible to fit a single tubular element or shell. Alternatively, in case the package 1 provides to fit the first and second shells 7, 10, the process can provide the steps of vertically fitting the first shell 7, rotating the barrel (by turning it upside down by 180°) and fitting, on the opposite side, the second shell 10.

Apparatus for Packaging Barrels

Further, it is an object of the present invention an apparatus 100 for packaging barrels 2 destined to contain alcoholic beverages B, and particularly for making a package 1 according to the above cited description.

As it is visible for example in FIG. 1, the apparatus 100 comprises at least one base 101 configured for receiving and supporting at least one barrel 2 for example arranged in a horizontal position, wherein the barrel 2 longitudinal axis extends along a vertical direction. The base 101 comprises, in a non limiting way, a flat body—for example a plate-shaped element —extending between a first and second ends 101a, 101b (see FIG. 6, for example).

As it is visible for example in FIG. 6, the base 101 comprises at least one abutment portion 105—extending between said first portion 101a of the base and a second portion, which is also, for example, an end portion 101b of the base 101—defining a cavity 106 configured for receiving and stably engaging the lateral wall 2c of at least one barrel 2, so that the same barrel 2 received from the base 101 in said horizontal position is placed between the first and second portions 101a, 101b horizontally abutting on the lateral wall 2c thereof.

The attached figures illustrate a preferred but non limiting embodiment of the invention wherein the abutment portion 105 comprises four cylinders arranged in order to define a rectangular or squared shape; the cylinders are sloped towards a single center of the square or rectangle in order to define the cavity 106. Barrel 2 is configured for abutting by the lateral wall 2c thereof on the four cylinders which, due to the distance present between each other and the slope enable to stably support the barrel 2 (see FIG. 7, for example). Advantageously but in a non limiting way, the abutment portion 105 is defined at the longitudinal and transversal centerline of the base 101: in such arrangement, the barrel 2 is placed at the center of the base 101 and substantially is at the same distance from the ends 101a and 101b.

As it is visible in the attached figures, the apparatus 100 comprises at least one fitting group 102 engaged at the base 101, particularly at the first end 101a. As it is visible for example in FIG. 6, the fitting group 102 exhibits at least one frame 103 horizontally movable with respect to the base 101 along a fitting direction C between a starting position, defined at a first portion, optionally an end portion 101a, of the base 101 and a final position, spaced from the first portion 101a. It is noted that the fitting direction C of the frame 103 of the fitting group 102 is rectilinear and parallel to the barrel 2 longitudinal axis.

The frame 103 comprises at least one guiding element 104 configured for engagingly receiving at least one jacket 4 (at least one tubular element or at least one shell). More specifically, under a working condition wherein said base 101 receives the barrel 2, the frame 103 is configured for: in a starting position, being placed at a distance from the barrel 2 and enabling to position and engaging the jacket 4 on the guiding element 104, after positioning the jacket 4 on the guiding element 104, horizontally moving along the fitting direction C and enabling the guiding element 104 to fit the jacket 4 on the barrel 2.

Advantageously but in a non limiting way, the frame 103 of the fitting group 102 is configured for moving along the base 101 to a final position in which at least the guiding element 104 is arranged besides a maximum or mid cross-section of a barrel 2, for example received from the base 101 in a horizontal position.

More particularly, the guiding element 104 comprises a plurality of, optionally at least four, pushers 107 configured for externally receiving the tubular element of the jacket 4 (for externally receiving the tubular element 5, for example so that the internal lateral surface of this latter directly contacts the pushers 107) and for arranging this latter in a circular arrangement substantially countershaped to the lateral wall 2c. The guiding element 104, after moving the frame 103 from the starting position to the final one, is configured for fitting the tubular element (for example the element 5) outside the barrel 2 so that the jacket 4 can cover at least a preponderant part of the barrel 2 lateral wall 2c as hereinbefore described with reference to the package 1 (for example, with a portion of the elastically deformed tubular element and intimately adhering to the lateral wall 2c).

Still more particularly, the guiding element 104 is configured for being arranged in a first operative condition, wherein the pushers 107 are radially approached each other in order to substantially define a first circumference which enables to engage the tubular element on the guiding element 104 (see FIGS. 6 and 7, for example). De facto, under the first operative condition, the pushers are radially approached each other in order to enable to easily position the jacket on the guiding element 104: under such condition, the jacket is not tightened by the pushers 107. Further, the guiding element 104 is configured for being arranged in a second operative condition wherein the pushers 107 are radially spaced from each other with respect to the first operative condition in order to define a second circumference having a diameter greater than the one of the first circumference (see FIG. 9, for example, wherein the pushers are closely contacting the tubular element 5). De facto, the guiding element 104, after switching from the first to the second operative conditions, is configured for tensioning the jacket tubular element (for example the tubular element 5) so that the same can be stably engaged with the guiding element.

Therefore, the apparatus 100 is configured for moving the guiding element 104 from the starting position to the final one only after switching the guiding element 104 from the first to the second operative position. Tensioning the jacket 4 placed on the guiding element 104 helps fit the same around the barrel 2.

As hereinbefore described, the jacket 4 can, in a non limiting way, be of a type comprising a first tubular element 5 and a base 6 defining a first shell 7. The guiding element 104 of the fitting group 102 is therefore configured for arranging the first tubular element 5 of the first shell 7 around the lateral wall 2c, the base 6 being placed against the first longitudinal closing portion 2a of the barrel 2. In such arrangement, the first shell 7 is fitted around the guiding element 104, so that the tubular element 5 is placed around the pushers 107. The guiding element 104, after switching from the first to the second operative condition, is configured for tensioning the first shell 7 and then, after (horizontally, for example) moving the frame 103, fitting the first shell around the barrel (around the lateral wall 2c as hereinbefore described with reference to the package 1).

Figure 10:
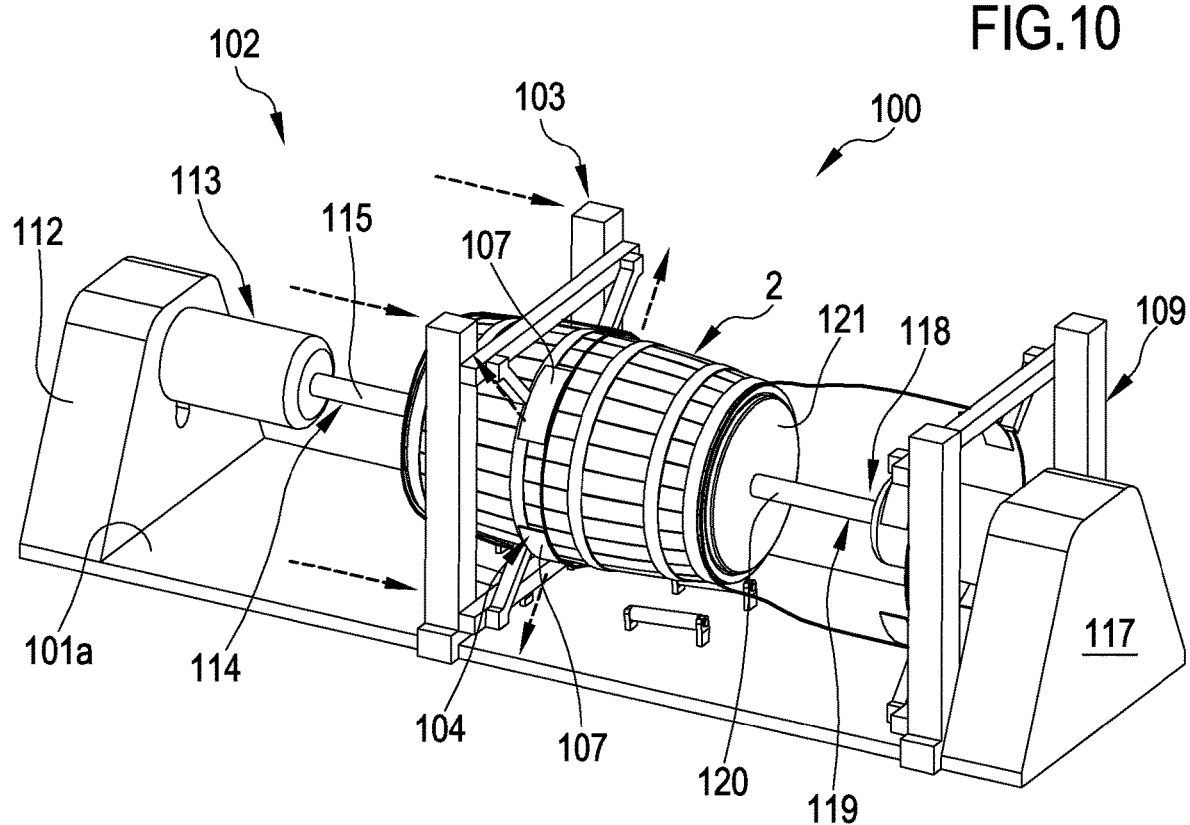
Figure 11:
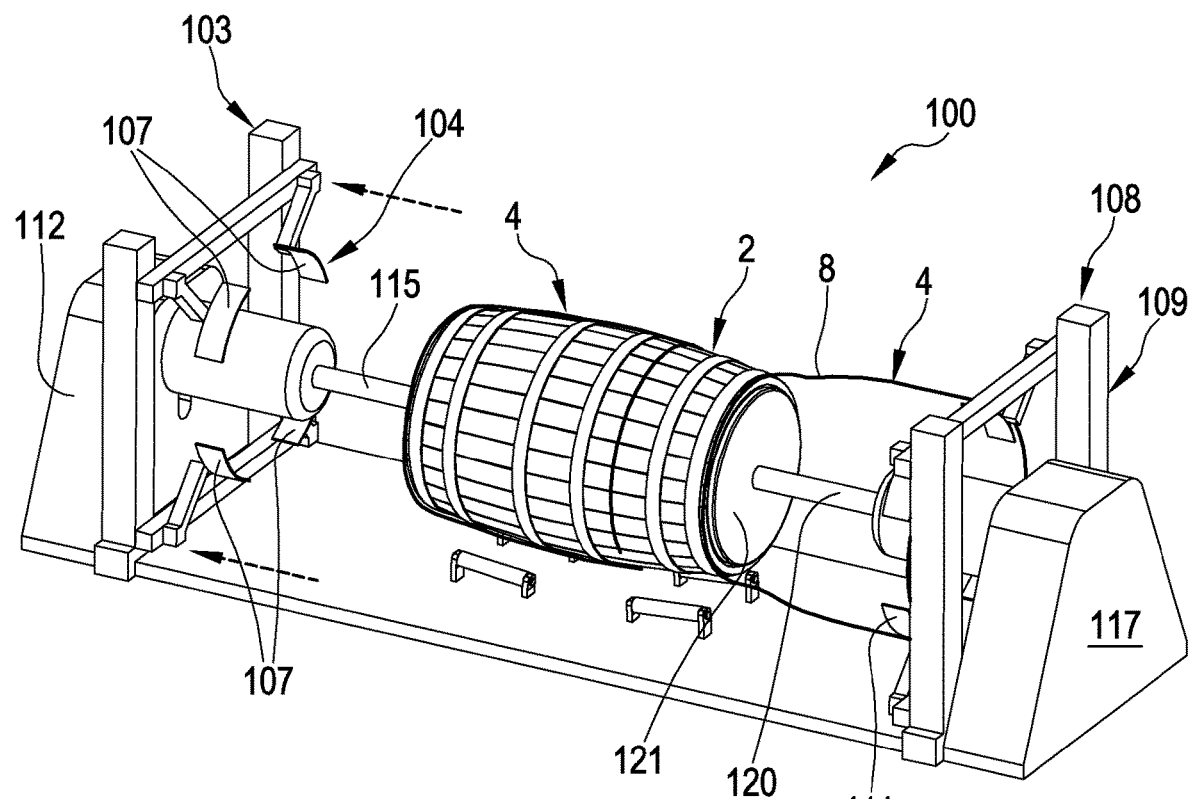

More specifically, the guiding element 104 is configured for receiving the shell 7 so that the same exhibits the base 6 (particularly the welding band 26) facing the barrel: after (horizontally, for example) moving the frame 103, the first shell is turned inside out the barrel 2 (see the turning inside out step outlined in FIG. 10, for example). In a non limiting way, the step of turning inside out the first shell 7 enables to elastically deform at least part of the tubular element 5 so that the same can at least partially intimately adhere to the lateral wall 2c as hereinbefore described with reference to the package 1.

As illustrated in the attached figures, the first fitting group 102 can comprise, in a non limiting way, at least one fixed structure 112 engaged at the first portion 101a of the base 101, and at least one actuator 113 engaged with the fixed structure 112. Particularly, the fixed structure 112 defines the end portion 101a of the base 101: the frame 103 is interposed between the fixed structure 112 and the second end portion 101b of the base 101. De facto, the fixed structure defines a stop position of the frame 103 adapted to define also the starting position of this latter (see FIGS. 6 and 7, for example). The actuator 113 is engaged, in a non limiting way, in a position radially inside the pushers 107 of the guiding element 104 of the same fitting group 102: the actuator 113 is placed inside the transversal size defined by the pushers 107.

The actuator 113 exhibits at least one piston 114 moveable with respect to the fixed structure 112 at least along a direction parallel to the fitting direction C of the frame 103. The piston 114 is translatingly movable (the attached figures illustrate, in a non limiting way, an arrangement of the piston wherein the same is translatingly movable in a horizontal direction) from a retracted position (FIGS. 5 and 6), wherein the piston 114 itself is configured for being spaced from the barrel 2 to an advanced position (FIGS. 8-13), wherein the piston 114 is configured for being placed in contact with the first longitudinal closing portion 2a of the barrel 2. De facto, the portion 112 is stationary with respect to the base 101, while the piston 114 is movable with respect to the base 101 advantageously independently from the frame 103. More particularly, the piston 14 comprises a stem 115 ending with a head 116: the head 116 is configured for contacting the base of a shell (for example the base 6 of the first shell) and then being placed at a closing portion of the barrel (the first longitudinal closing portion 2a, for example). De facto, in the arrangement wherein the jacket 4 comprises the first shell 7, the piston 114 head 116 is configured for receiving and being placed at the base 6 in the step of positioning the shell 7 on the guiding element 104 as illustrated in FIG. 7; the piston 114 head 116 is then configured for positioning the base 6 of the first shell 7 at the first longitudinal closing portion 2a of the barrel 2. The piston acting on the base 6 enables to position this latter at the barrel 2 portion 2a and arrange the welding band 26 inside the recess 27. After positioning the base 6 of the first shell 7 at the first closing portion of the barrel 2—the guiding element 104 is configured for translatingly approaching the head 116 of the piston 114 and therefore along the barrel 2 by turning inside out the tubular element 5 around the corresponding base 6 and then fitting the first shell 7 on the lateral wall 2c of the barrel 2 as hereinbefore described with reference to the package 1. The head 116 acting on the base 6 enables the piston 114 to block the first shell 7 to the barrel 2 portion 2a, while the guiding element 104 turns inside out the tubular element 5 around the lateral wall 2c.

In the arrangement wherein the jacket 4 comprises only one tubular element (the element 5 or 8) or only one shell (the shell 7 or 10), the apparatus 100 can be provided with only one fitting group 102. For example, under the condition wherein the jacket 4 is only defined by the tubular element 5 or by the first shell 7, the apparatus 100 can only be provided with the fitting group 102 for covering the barrel 2.

However, as hereinbefore described, the jacket 4 can comprise, in addition to the tubular element 5 or shell 7, a second tubular element 8 or second shell 10. Under such condition, the apparatus 100 can be provided, in addition to the fitting group 102, with a further fitting group 108. The fitting group 102 is dedicated to apply the tubular element 5 or shell 7, while the further fitting group 108 is dedicated to apply the tubular element 8 or second shell 10.

Particularly, the further fitting group 108 is engaged at the second end 101b oppositely the fitting group 102. Advantageously, the fitting group 102 and the further fitting group 108 are identical: the groups 102 and 108 exhibit the same structure, particularly the same configuration, shape and size.

Specifically, as it is visible in FIG. 6 for example, the further fitting group 108 exhibits at least one frame 109 horizontally movable with respect to the base 101 along the fitting direction C between a starting position, defined at a first portion, optionally the end portion 101a, of the base 101 and a final position, spaced from the first portion 101a. It is noted that the fitting direction C of the frame 109 of the further fitting group 108 is rectilinear and parallel to the barrel 2 longitudinal axis.

De facto, the frames 103 and 109 are respectively movable along the same fitting direction C; the frame is configured for horizontally moving along the base 101 by approaching and going away from the further fitting group 108, while the frame 109 is configured for horizontally moving along the base 101 by approaching and going away from the further fitting group 108.

The frame 109 comprises at least one guiding element 110 configured for engagingly receiving at least one jacket 4 (particularly the second tubular element 8 or the second shell 10). More particularly, under a working condition wherein said base 101 receives the barrel 2, the frame 109 is configured for: in the starting position, being distantly placed from the barrel 2 and enabling to position and engage the jacket 4 on the guiding element 110, after positioning the jacket 4 on the guiding element 110, horizontally moving along the fitting direction C and enabling the guiding element 110 to fit the tubular element 8 or shell 10 on the barrel 2.

Advantageously but in a non limiting way, the frame 109 of the further fitting group 108 is configured for moving along the base 101 to the final position in which at least the guiding element 110 is placed besides a maximum or mid cross-section of a barrel 2, for example, received from the base 101 in a horizontal position.

More particularly, the guiding element 110 comprises a plurality of, optionally at least four, pushers 111 configured for externally receiving the tubular element 9 of the jacket 4 (for externally receiving the tubular element 8 so that the internal lateral surface of this latter directly contacts the pushers 111, for example), and arranging this latter in a circular arrangement substantially countershaped to the lateral wall 2c. The guiding element 110, after moving the frame 109 from the starting position to the final one, is configured for fitting the tubular element 8 outside the barrel 2 so that the jacket 4 can cover at least a preponderant part of the lateral wall 2c of the barrel 2 itself as hereinbefore described with reference to the package 1.

Still more particularly, the guiding element 110 is configured for being arranged in a first operative condition wherein the pushers 111 are radially approached each other in order to substantially define a first circumference enabling the engagement of the tubular element 8 on the guiding element 110 (see FIGS. 6 and 7, for example). De facto, in the first operative condition, the pushers 111 are approached each other for enabling to easily position the jacket 4 (the tubular element 8 or shell 10) on the guiding element 110: under such condition, the jacket 4 is not tightened by the pushers 111. Further, the guiding element 110 is configured for being arranged in a second operative condition wherein the pushers 111 are radially spaced from each other with respect to the first operative condition in order to define a second circumference having a diameter greater than the one of the first circumference (see FIG. 9 wherein the pushers 111 closely contact the tubular element 8, for example). De facto, the guiding element 110, after switching from the first to the second operative conditions, is configured for tensioning the tubular element 8 of the jacket so that the same can be stably engaged with the guiding element 110.

Therefore, the apparatus 100 is configured for moving the guiding element 110 from the starting position to the final position only after switching the guiding element 110 from the first to the second operative position. Tensioning the jacket 4 placed on the guiding element 110 helps fit the same around the barrel 2.

As hereinbefore described, the jacket 4 can, in a non limiting way, be of a type comprising a firsts tubular element 8 and a base 9 in order to define a second shell 10. The guiding element 110 of the further fitting group 108 is therefore configured for arranging the tubular element 8 of the shell 10 around the lateral wall 2c, the base 9 abutting on the second longitudinal closing portion 2b of the barrel 2. In such arrangement, the shell 10 is fitted around the guiding element 110 so that the tubular element 8 is placed around the pushers 111. The guiding element 110, after switching from the first to the second operative condition, is configured for tensioning the shell 10 and then, after (horizontally, for example) moving the frame 109, fitting the shell 10 around the barrel (around the lateral wall 2c as hereinbefore described with reference to the package 1).

Figure 12:
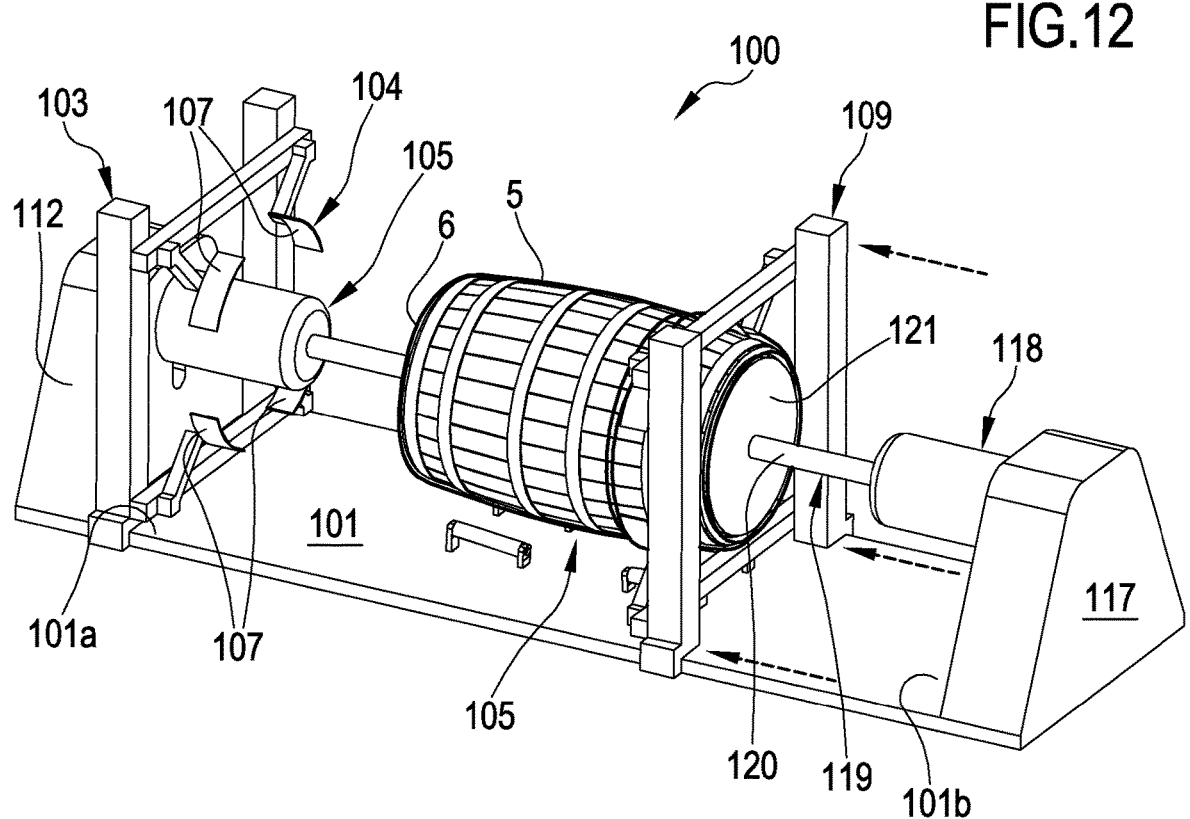
Figure 13:
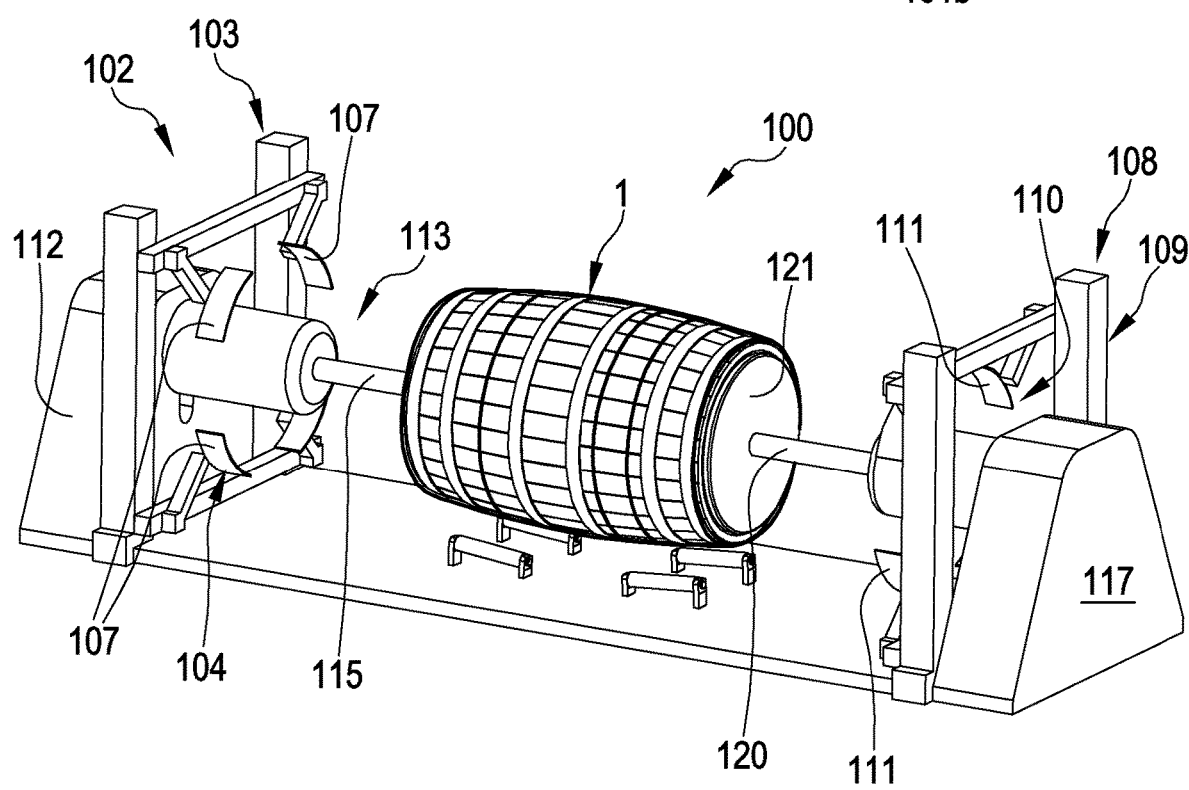
Figure 14:
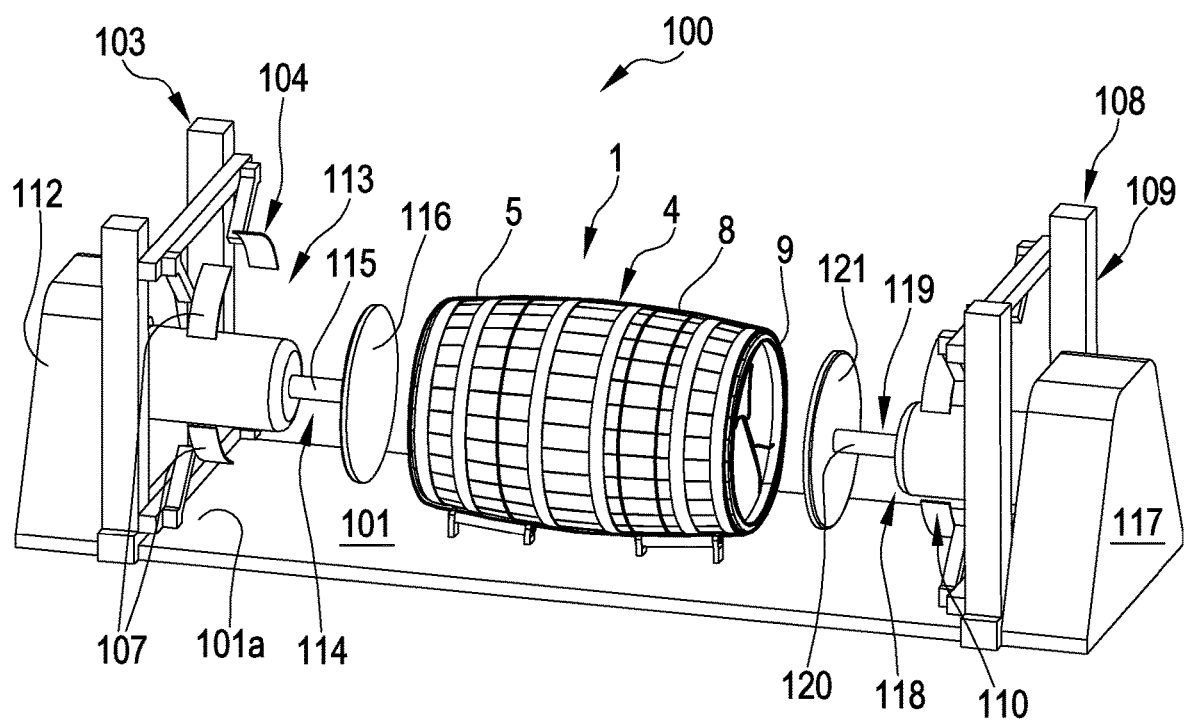
Figure 15:
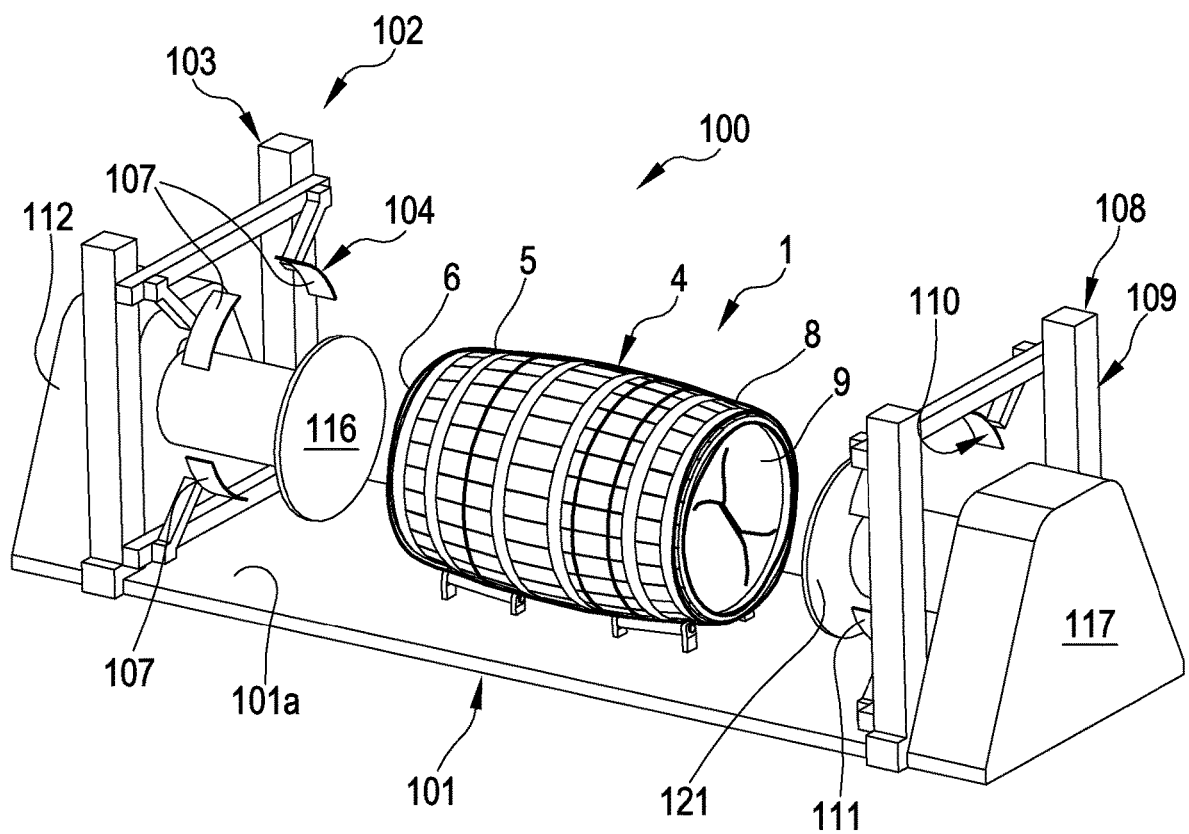

More particularly, the guiding element 110 is configured for receiving the shell 10 so that the same exhibits the base 9 (particularly the welding band 29) facing the barrel 2: after (horizontally, for example) moving the frame 109, the shell 10 is turned inside out around the barrel 2 (see the step of turning inside out the shell 10 outlined in FIG. 12, for example). As hereinbefore described, also the tubular element 8 exhibits an at least partially deformed portion closely adhering to the lateral wall 2c; during the movement of the guiding element 110, this latter is configured for turning inside out the tubular element 8 which is at least partially elastically deformed and placed with an at least intimate adhesion to the lateral wall 2c.

As illustrated in the attached figures, the further fitting group 108 can comprise, in a non limiting way, at least one fixed structure 117 engaged in correspondence of the second portion 101b of the base 101 and at least one actuator 118 engaged with the fixed structure 117. Specifically, the fixed structure 117 defines the end portion 101b of the base 101: the frame 109 is interposed between the fixed structure 117 and the first end portion 101a of the base 101. De facto, the fixed structure 117 defines a stop position of the frame 109, adapted to define also the starting position of this latter (see FIGS. 6 and 7, for example). The actuator 118 is engaged, in a non limiting way, in a position radially inside the pushers 111 of the guiding element 110 of the same fitting group 108: the actuator 118 is placed inside the transversal size defined by the pushers 111.

The actuator 118 exhibits at least one piston 119 movable with respect to the fixed structure 117, at least along a direction parallel to the fitting direction C of the frame 109. The piston 119 is translatingly movable (the attached figures illustrate, in a non limiting way, an arrangement of the piston wherein the same is translatingly horizontally movable) from a retracted position (FIGS. 5 and 6), wherein the same piston 119 is configured for being spaced from the barrel 2 to an advanced position (FIGS. 8-13), wherein the piston 119 is configured for being placed in contact with the second longitudinal closing portion 2b of the barrel 2. De facto, the portion 117 is fixed with respect to the base 101, while the piston 119 is movable with respect to the base 101, advantageously, independently from the frame 103. More specifically, the piston 119 comprises a stem 120 ending with a head 121: the head is configured for contacting the second longitudinal closing portion 2b of the barrel 2. In the arrangement wherein the jacket 4 comprises the shell 10, the head 121 of the piston 119 is configured for receiving and contacting the base 9 when the shell 10 is positioned on the guiding element 110 as illustrated in FIG. 7; the piston 119 head 121 is then configured for positioning the shell 10 base 9 at the second longitudinal closing portion 2b of the barrel 2. The piston acting on the base 9 enables to position this latter in contact with the portion 2b of the barrel and arrange the welding band 29 inside the recess 28. After positioning the shell 10 base 9 at the barrel 2 closing portion 2b—the guiding element 110 is configured for moving by approaching the piston 119 head 121 and therefore along the barrel 2 in order to turn inside out the tubular element 8 around the corresponding base 9, and then fitting the shell 10 on the barrel 2 lateral wall 2c, as hereinbefore described with reference to the package 1. The head 121 acting on the base 9 enables the piston 119 to lock the shell 10 to the barrel 2 portion 2b, while the guiding element 110 turns inside out the tubular element 8 around the lateral wall 2c.

The attached figures illustrate an apparatus 100 which, for applying the shells 7 and 10, is provided with fitting groups 102 and 108: the group 102 is dedicated to apply the first shell 7 while the group 108 is dedicated for applying the second shell 10. However, it is not excluded the possibility of providing just one fitting group (for example the group 102) for applying both the shells 7, 10; in such latter configuration, the apparatus 100 could enable to apply the first shell 7, as hereinbefore described and following the rotation by 180° of the barrel along a vertical axis, enable to apply the second shell 10 by the same fitting group; in such embodiment, the apparatus could advantageously be provided with an horizontal flipping over unit which, after applying the first shell 7, is configured for flipping over the barrel 2 and enabling to apply the second shell by the same fitting group.

Further, the attached figures illustrate, in a non limiting way, an apparatus 100 exhibiting a horizontal fitting direction C, in such arrangement, fitting the jacket 4 and particularly the tubular elements 5 and 8 is performed along horizontal directions. The actuator 113 of the fitting group 102 and the actuator 118 of the further fitting group 108 are configured for moving transversally to the fitting direction C, substantially along a vertical direction in order to help fit such elements 5 and 8. Said actuators, when arranged in the advanced positions in contact with the respective longitudinal closing portions of the barrel 2, are configured for substantially vertically moving and enabling to raise the barrel 2 as illustrated in FIG. 9, for example; the guiding elements 104 and 110 are configured for moving along a barrel 2 placed in said horizontal position after raising this latter by means of the actuators.

As illustrated in FIG. 6, advantageously the apparatus 100 can comprise a control system 122 connected to the fitting group 102 and active on said frame 103. The control system 122 is configured for commanding the frame 103 to move and placing the jacket (particularly the tubular element or first shell 7) at least partially around the barrel 2 placed, particularly horizontally, on the abutment portion 105 so that the tubular element can cover at least the 50%, particularly at least the 70% of the barrel 2 lateral wall 2c (optionally the whole barrel 2 lateral wall 2c) as hereinbefore described with reference to the package 1. Advantageously, the control system 122 is configured for commanding the frame 103 to switch from the starting position to the final one, and then to translate along the fitting direction C and enabling to position the jacket 4 on the barrel 2, with the guiding element 104 placed in the second operative condition. Advantageously, the control system 122 is further connected to the guiding element 104 and is configured for commanding the first and second operative conditions of this latter. Advantageously, the control system 122 is configured for commanding the first operative condition to the guiding element 104 when positioning the jacket on the element 104 itself; then the control system 122 is configured for commanding the second operative condition of the jacket 104 and therefore for moving the frame 103 in the final position for fitting the jacket 4. De facto, the control system 122 enables to synchronize the operative conditions of the element 104 with the movement of the frame 103.

In the embodiment illustrated in the attached figures, the apparatus 100 comprises the further fitting group 108 for enabling to apply the tubular element 8 and/or second shell 10. Under such condition, advantageously the control system 122 is also connected to the further fitting group 108 and is active on the frame 109. The control system 122 is configured for commanding the frame 109 to move and placing the jacket 4 (particularly the tubular element 8 or shell 10) at least partially around the positioned barrel 2, particularly horizontally, on the abutment portion 105 so that the tubular element 8 can cover at least the 50%, particularly at least the 70%, of the barrel 2 lateral wall 2c (optionally the whole lateral wall 2c of the barrel 2) as hereinbefore described with reference to the package 1. Advantageously, the control system 122 is configured for commanding the frame 109 to switch from the starting position to the final one, and then to move along the fitting direction C and enable to position the jacket 4 on the barrel 2, the guiding element 110 being arranged in the second operative condition. Advantageously, the control system 122 is connected further to the guiding element 110 and is configured for commanding the first and second operative conditions of this latter. The control system 122 is advantageously configured for commanding the first operative condition to the guiding element 110 when positioning the jacket 4 on the element 110 itself; then the control system 122 is configured for commanding the second operative condition of the element 110 and then to move the frame 109 in the final position for fitting the jacket 4. De facto, the control system 122 enables to synchronize the operative conditions of the element 110 with the frame 109 movement.

Preferably, but in a non limiting way, the control system 122 is configured for commanding the frame 109 of the further fitting group 108 to move along the base 101 from the starting position to the final one in a delayed manner with respect to the movement from the starting position to the final one, of the frame 103 of the fitting group 102 so that the second tubular element 8 can be fitted on the barrel 2 after fitting the first tubular element 5. In such a way, the control system 122 would prevent the elements 104 and 110 from impacting in case the package 1 provides to partially overlap the tubular elements as outlined in FIGS. 1 and 1A, respectively.

De facto, the control system 122 is configured for commanding the guiding element 104 to move along the fitting direction C and placing the first tubular element 5 of the jacket 4 on the barrel 2 so that it can cover at least the lateral wall 2c of the first half of the barrel 2 and, optionally, at least one portion of the lateral wall 2c of the second half of the barrel 2, particularly at least the 10% of the lateral wall 2c of the second half of the barrel 2. Further, the control system 122 is configured for commanding the guiding element 110 to move along the same fitting direction C and placing the second tubular element 8 of the jacket 4 on the barrel 2 so that it can cover at least the lateral wall 2c of the second half of the barrel 2 and, optionally, at least one portion of the lateral wall 2c of the first half of the barrel 2, particularly, by overlapping the first tubular element 5.

Preferably, in the arrangement wherein the apparatus 100 is provided with the actuators 113 and 118, the control system 122 is further connected to these latter for commanding them. Particularly, the control system 122 is configured for commanding the synchronized advancement of the pistons 114 and 119 for blocking the barrel 2 and possibly for raising the same, as illustrated in FIG. 9.

In a preferred but non limiting embodiment of the invention, the apparatus 100 can further comprise at least one forming station (not illustrated in the attached figures) configured for obtaining the tubular element 5 and/or the first shell 7 from a respective first tubular shape precursor body; the forming station having at least one welding unit configured for heat-sealing mutually facing surfaces of the first precursor body in order to form the first welding band 26 and at least one separating unit configured for separating or cutting transversally the first precursor body in order to define said first base 6 at which the first welding band extends.

The same forming station, or a further distinct forming station (not illustrated in the attached figures) is configured for obtaining the tubular element and/or the second shell 10 from a respective second tubular shape precursor body. Said forming station or said further forming station having at least one welding unit configured for welding mutually facing surfaces of the second precursor body in order to form the second welding band 29 and at least one separating unit configured for separating or cutting transversally the second precursor body in order to define the base 9 at which the second welding band 29 extends; the first and second precursor bodies can be two distinct tubular bodies or following parts of the same tubular body.

Alternatively or in combination with the forming station, the apparatus 100 can comprise at least one roll having a precursor body in which a plurality of welding bands are formed at regular intervals; the apparatus 100 can therefore be provided with a separating unit for the precursor body, configured for separating or cutting transversally the precursor body at the welding bands in order to form discrete portions each defining one of said first and second tubular elements 5, 8 and/or said first and second shells 7, 10.

The attached figures illustrate an embodiment of the apparatus 100, configured for enabling to fit the jacket along a substantially horizontal direction: positioning the barrel 2 and horizontally moving the frames along a horizontal direction C.

In a further embodiment non illustrated in the attached figures, the apparatus 100 can comprise an abutment portion configured for enabling to vertically support the barrel 2; this latter is abutted on the apparatus 100 base at the first or second closing portions 2a, 2b. In such arrangement, the apparatus 100 can only comprise just one fitting group configured for being placed above the barrel 2; such fitting group exhibits substantially the same structure as the fitting group 102 except that the frame moves along a substantially vertical direction. In this latter embodiment of the apparatus 100 (vertical fitting), the guiding element is configured for engagingly receiving a tubular element or shell having the base facing the barrel 2; the guiding element, after positioning the jacket 4, is configured for vertically moving downwardly and wrapping at least partially the barrel 2 for fitting the tubular element or shell around the lateral wall 2c as hereinbefore described with reference to the package 1. In this latter embodiment of the apparatus 100 (vertical fitting), this latter can provide a flipping over unit configured for flipping over the barrel 2 after fitting a first jacket (for example the tubular element 5 and/or first shell 7). After flipping over the barrel 2, the guiding element is configured for engagingly receiving a second jacket (for example a tubular element 8 and/or second shell 10) and fitting it around the barrel 2, as hereinbefore described with reference to the package 1.

Process for Packaging Barrels

Further, it is an object of the present invention a process for packaging barrels by means of the apparatus 100 according to the hereinabove discussed description.

The process comprises a step of providing the barrel 2; before closing the compartment 3, a predetermined quantity of an alcoholic beverage B is introduced in the barrel 2. After providing the barrel 2, the same is arranged, in a non-limiting way, horizontally on the abutment portion 105 (inside the cavity): the longitudinal axis extends along a substantially horizontal development plane.

Providing the barrel 2 can for example comprise a step of gripping the barrel 2 from a storing area; after the gripping step, a step of orienting the barrel 2 so that the same exhibits the first longitudinal closing portion 2a facing the first end portion 101a of the base 101 and the second longitudinal closing portion 2b facing the second end portion 101b of the base 101. After, the barrel 2 is horizontally positioned on the base 101.

Afterwards, the process comprises the step of providing the jacket 4; such step, as hereinbefore described, can be performed by extruding a plastic film, in order to define at least one tubular precursor body, optionally a first and second precursor tubular distinct bodies, of plastic film, or unrolling from a roll a longitudinal portion of a preformed tubular precursor body. Then, the step of providing the jacket 4 can provide at least one step of cutting or separating the tubular precursor body in segments having a predetermined length in order to define said jacket 4 of plastic material having a tubular shape, particularly for defining the tubular element 5 and/or the further tubular element 8, particularly wherein the precursor body comprises separation pre-die cut transversal lines for enabling a step of tear separating the precursor body in said predetermined length segments.

As hereinbefore described, providing the jacket 4 can further provide at least one welding step for heat-sealing mutually facing surfaces of the precursor body in order to form the welding band 26, 29; the separating or cutting step is configured for separating or cutting transversally the precursor body at the welding band 26, 29 in order to define the base 6, 9 of one of said first and/or second shells 7, 10. Alternatively, the process provides that said roll comprises a precursor body in which a plurality of welding bands placed at regular intervals are preformed; the separating or cutting step is configured for separating or cutting transversally the precursor body at the welding bands in order to form discrete portions each defining one of said first and second shells (optionally wherein said pre-die cut separation lines extend adjacent and parallelly to the welding bands).

When the jacket 4 comprises only one tubular element 5 or only one shell 7, after forming the jacket 4, this latter is engaged on the guiding element 104 of the fitting group 102 when this is arranged in the starting position. Particularly, the step of engaging the jacket is performed during the first operative condition of the guiding element 104 (the pushers 107 are radially approached). Then, the pushers 107 are arranged in the second operative condition for tensioning the jacket 4. After tensioning the jacket 4, the process provides to fit the jacket 4 on the barrel 2 by advancing the frame 103 along the fitting direction C: during the fitting step, the guiding element 104 horizontally moves outside the barrel 2 by arranging the jacket 4, carried by the same guiding element 104, around a preponderant part of the barrel 2 lateral wall 2c. Particularly, the fitting step provides to move the frame 103 along the base 101 to a respective final position in which at least the guiding element 104 is arranged besides the maximum or mid cross-section of the barrel 2.

More specifically, the step of engaging the jacket 4 on the guiding element 104 comprises the step of engaging the tubular element 5 around the pushers 107 of the fitting group 102 so that the guiding element 104 can be arranged in a circular configuration substantially countershaped to the external lateral wall 2c of the barrel 2. More specifically, the step of engaging the tubular element 5 and/or the first shell 7 on the guiding element 104 comprises the step of providing the guiding element 104 in the first operative position, engaging the first tubular element 5 of the jacket around the pushers 107, and providing the guiding element 104 of the fitting group 102 in the second operative condition for tensioning the first tubular element 5 so that the same can be stably engaged with the guiding element 104 itself. After tensioning the tubular element 5, the frame 103 is horizontally moved from the starting position to the final one for fitting the jacket 4 (particularly the tubular element 5 and/or shell 7) around the barrel 2, as hereinbefore described with reference to the package 1. Specifically, fitting by the guiding element 104 places the tubular element 5 on at least the lateral wall 2c of the first half of the barrel 2 and optionally on a portion of the lateral wall 2c of the second half of the barrel 2, particularly on at least the 10% of the lateral wall 2c of the second half of the barrel 2. As hereinbefore described, the fitting step enables, in a non limiting way, to elastically deform at least part of the tubular element 5 so that the same can be placed at least partially with an intimate adhesion on the lateral wall 2c, as hereinbefore described with reference to the package 1.

In case the tubular element 5 of the jacket 4 is of a type comprising at least one base 6 defining a first shell 7, the fitting step provides to move the guiding element 104 of the fitting group 102 for arranging the first tubular element 5 of the first shell 7 on the barrel 2 lateral wall 2c, while the base 6 is placed against the first longitudinal closing portion 2a of the barrel 2.

Particularly, the first shell 7 is engaged with the guiding element 104 of the fitting group 102, the base 6 facing the first barrel 2 closing portion 2a (FIG. 7) and the tubular element 5 extending from the base away from the barrel 2; during the fitting step, the guiding element 104 of the fitting group 102 moves outside the barrel 2 and enables to turn inside out the first tubular element 5 of the first shell 7 around the corresponding base 6 and to place it on the barrel 2 itself. Advantageously, before moving the guiding element 104, the process provides to position the base 6 at the closing portion 2a by the action of the piston 114: the head 116 is caused to advance until the welding band 26 is placed inside the recess 27. Under such condition, the first shell is stably constrained to the head 116 and pushers 107.

As hereinbefore described, the jacket 4 can further comprise a second tubular element 8 and/or second shell 10 in addition to the tubular element 5 and shell 7. In such arrangement, after forming the jacket 4, the first tubular element or first shell is engaged on the guiding element 104 of the fitting group 102, as hereinbefore described, while the second tubular element 8 or second shell is engaged on the guiding element 110 of the fitting group 108.

As for the first tubular element 5, also the second tubular element 8 is engaged with the element 110 when this latter is in the starting position. Particularly, the step of engaging the tubular element 8 is performed during the first operative condition of the guiding element 110 (the pushers 111 are radially approached). Then, the pushers 111 are arranged in the second operative condition for tensioning the tubular element 8. After tensioning the jacket 4, the process provides to fit the jacket 4 on the barrel 2 by advancing the frame 109 along the fitting direction C: during the step of fitting the guiding element 110 by horizontally moving outside the barrel 2 and placing the tubular element 8 carried by the same guiding element 110 around a preponderant part of the barrel 2 lateral wall 2c. Specifically, the fitting step provides to move the frame 109 along the base 101 to a respective final position in which at least the guiding element 110 is arranged besides the maximum or mid cross-section of the barrel 2.

More specifically, the step of engaging the jacket 4 on the guiding element 110 comprises the step of engaging the tubular element 8 around the pushers 111 of the fitting group 108 so that the guiding element 110 of the fitting group 108 can be arranged in a circular arrangement substantially countershaped to the barrel 2 external lateral wall 2c. More particularly, the step of engaging the tubular element 8 and/or shell 10 on the guiding element 110 comprises the step of providing the guiding element 110 in the first operative position, engaging the tubular element 8 of the jacket around the pushers 111, providing the guiding element 110 of the fitting group 108 in the second operative condition for tensioning the first tubular element 8 so that the same can be stably engaged with the same guiding element 110. After tensioning the tubular element 8, the frame moves horizontally from the starting position to the final one for fitting the jacket 4 (particularly the tubular element 8 and/or shell 10) around the barrel 2 as hereinbefore described with reference to the package 1. Specifically, fitting by means of the guiding element 110, places the tubular element 8 on at least the lateral wall 2c of the second half of the barrel 2 and optionally on a portion of the lateral wall 2c of the first half of the barrel 2, particularly on at least the 10% of the lateral wall 2c of the first half of the barrel 2.

In case the tubular element 8 of the jacket 4 is of a type comprising at least one base 9 defining a shell 10, the fitting step provides to move the guiding element 110 of the fitting group 108 for placing the shell 10 tubular element 8 on the barrel 2 lateral wall 2c, while the base 9 is placed against the first longitudinal closing portion 2b of the barrel 2.

Particularly, the shell 10 is engaged with the guiding element 110 of the fitting group, the base 9 facing the closing portion 2b of the barrel 2 (FIG. 7) and the tubular element 8 extending from the base away from the barrel 2; during the fitting step, the guiding element 110 of the fitting group 108 moves outside the barrel 2 and enables to turn inside out the first tubular element 8 of the shell 10 around the corresponding base 9 and to place it on the barrel 2 itself.

In a preferred but non limiting embodiment of the invention, the process therefore provides to fit both the first tubular element 5 and second tubular element 8. Advantageously, fitting the second tubular element 8 by the further fitting group 108, occurs thereafter, particularly immediately after fitting the first tubular element 5 by the fitting group 102; preferably but in a non limiting way, the second tubular element 8 is fitted so that it partially overlaps the first tubular element 5.

In a preferred but non limiting embodiment of the invention, before fitting (turning inside out) the tubular elements 5 and 8 around the barrel 2 lateral wall 2c, this latter is raised for helping cover the wall 2c. Particularly, the step of providing the barrel 2 comprises the step of placing the actuator 113 of the fitting group in the advanced condition wherein the piston 114 is in contact with the first longitudinal closing portion of the barrel 2; also the actuator 118 of the further fitting group 108 is placed in the advanced condition wherein the piston 119 is in contact with the second longitudinal closing portion of the barrel 2: under the advanced conditions of both the actuators 113, 118, the barrel 2 is longitudinally constrained. Then, the barrel 2 is vertically raised so that the same is vertically spaced from the abutment portion 105 of the base 101; the raising step is performed by vertically moving the actuators of the fitting group and the further fitting group, after moving the same to the advanced condition wherein the pistons of said groups are in contact with the respective longitudinal closing portions of the barrel 2.

The step of fitting the jacket 4 provides to move outside and along the barrel 2 the guiding elements 104, 110 after raising the same barrel 2; particularly, at the end of the step of fitting the jacket 4, the actuators vertically move downwards in the direction of the base 101 for enabling the barrel 2 coated on the base 101 itself to abut on.

The above described process provides to fit the shells 7, 10 around the barrel 2 by distinct fitting groups (102 and 108). However, the process can provide to fit the shells 7 and 10 by a single fitting group. In such embodiment, the process provides to position and fit the first shell 7 around the barrel 2 (fitting the first shell from the first half of the barrel 2); after, the process provides to rotate the barrel 2 by 180°. Then, the second shell can be engaged on the same fitting group; afterwards, the second shell can be fitted around the barrel from the second half of this latter.

In a further variant of the embodiment not shown in the attached figures, the process can provide to vertically position the barrel 2: the barrel 2 abuts on the base 101 for example on the first portion 2a. Then, a layer 4 which after being tightened is fitted around the barrel 2, is engaged on a fitting group placed above the barrel 2, by moving downwards a guiding element. In case the jacket 4 comprises a shell, the process can provide to position the shell base by vertically moving a piston. Under such condition, the piston moves along a vertical direction and the respective head is configured for contacting the base for placing it at the closing portion opposite to the closing portion abutting on the base 101. Also in this case, fitting the jacket 4 enables to elastically deform at least partially the tubular element so that the same can at least partially—intimately adhere to the lateral wall 2c.

In case the jacket 4 exhibits both the first and second shells, the vertical fitting process could provide, at the end of the first shell fitting step, to flip over the barrel 2 so that the first shell abuts on the base 101. Then, the second shell could be placed on the vertical fitting group and, after tensioning the tubular element, can be fitted around the barrel by vertically moving downwards the fitting group. The second shell therefore could be positioned oppositely the first shell, as hereinbefore described with reference to the package 1.

The invention claimed is:

1. A package for alcoholic beverages comprising:
   at least one barrel made at least partially of wood delimiting a compartment configured to contain or containing a predetermined quantity of an alcoholic beverage, the at least one barrel comprising:
   a lateral wall,
   a first and a second longitudinal closing portions closingly engaging axially opposite ends of the lateral wall, the first and second longitudinal closing portions cooperatively engaging the lateral wall delimiting said compartment,
   at least one jacket of a plastic material film engaged outside the at least one barrel by covering at least a predominant part of the lateral wall delimiting said compartment,
   wherein the at least one jacket comprise at least one elastically deformable tubular element fitted on said predominant part of the lateral wall of the at least one barrel and exhibiting at least one elastically deformed portion placed with an intimate adhesion to an external surface of the at least one barrel lateral wall
   wherein the at least one jacket exhibits a permeability to ethanol ETR (ethanol transmission rate) less than 8 $g/m^2/day$, and an oxygen permeability OTR (oxygen transmission rate) of at least 200 $cc/m^2/day$;
   wherein the at least one jacket is formed from a multilayer film comprising at least one ethanol barrier layer, said multilayer film having a thickness comprised between 0.01 and 2 mm, said multilayer film comprising: an internal layer as ethanol barrier layer film, a first external layer defining an external surface of the package and a second external layer opposite to the first external layer.

2. The package according to claim 1, wherein the at least one jacket covers at least 70% of the at least one barrel lateral wall.

3. The package according to claim 1, wherein the at least one barrel comprises:
   a first half extending from a first axial end of the barrel to a maximum cross-section or mid cross-section of the at least one barrel,
   a second half extending from the maximum cross-section or, respectively, from the mid cross-section of the at least one barrel to a second axial end of the at least one barrel,
   and wherein said at least one tubular element of the at least one jacket comprises:
   a first elastically deformable tubular element fitted on the lateral wall of the first half of the at least one barrel and exhibiting at least one respective elastically deformed portion placed with an intimate adhesion to at least part of an outer surface of the lateral wall of the first half of the at least one barrel;
   a second elastically deformable tubular element fitted on the lateral wall of the second half of the at least one barrel and exhibiting at least one respective elastically deformed portion placed with an intimate adhesion to at least part of an external surface of the lateral wall of the second half of the at least one barrel.

4. The package according to claim 3, wherein the at least one jacket comprises:
   a first shell including said first tubular element and at least one first base terminally joined to the first tubular element, the at least one first base being located at the first longitudinal closing portion of the at least one barrel, and the first tubular element wrapping the lateral wall of the first half of the at least one barrel,
   a second shell including said second tubular element, and at least one second base terminally joined to the second tubular element, the at least one second base being located at the second longitudinal closing portion of the at least one barrel and the second tubular element wrapping the lateral wall of the second half of the at least one barrel.

5. The package according to claim 4, wherein the first tubular element and at least one first base of the first shell are integrally joined to define a respective single body, and wherein the second tubular element and at least one second base of the second shell are integrally joined to define a respective single body, with the first and second shells covering at least the 90% of the at least one barrel external surface.

6. The package according to claim 4, wherein:
said first shell is obtained starting from a respective first tubular shape precursor body welded on itself to define said at least one first base at which a first welding band is formed,
said second shell is obtained starting from a respective second tubular shape precursor body welded on itself to define said at least one second base at which a second welding band is formed,
wherein said second precursor body is a tubular body distinct from the first precursor body or alternatively wherein the second precursor body is defined by a distinct segment of the same tubular body of the first precursor body;
wherein the first welding band comprises:
a pair of lips emerging from said at least said first base and welded to each other at mutually facing surfaces, and
on each side of said lips, a respective strip retracting towards a central area of the welding band, wherein terminal portions of said lips and said strips define, on each side of the first welding band, cooperatively with said at least one first base, a respective connection bellows;
and wherein the second welding band comprises:
a pair of lips emerging from said at least one second base and welded to each other at mutually facing surfaces, and
on each side of said lips, a respective strip retracting towards a central area of the welding band, wherein terminal portions of said lips and said strips define, on each side of the second welding band, cooperatively with said at least one second base, a respective connection bellows.

7. The package according to claim 6, wherein the lateral wall comprises first and second end edges and wherein the first end edge is placed perimetrally around the first closing portion and axially protrudes from an external surface of the first closing portion in order to define a first compartment delimited by said external surface of the first closing portion and by a radially inner surface of the first end edge ; wherein the second end edge is peripherally placed at the second closing portion and axially protrudes from the second closing portion in order to define a second compartment delimited by an external surface of the second closing portion and by a radially inner surface of the second end edge, and wherein the first welding band is housed in said first compartment and the second welding band is housed in a second compartment.

8. The package according to claim 4, wherein said first shell is turned inside out in order to arrange said first welding band in a position emerging from said at least one first base and extending towards the interior of the first shell, and wherein said second shell is turned inside out in order to arrange said second welding band in a position emerging from said second base and extending towards the interior of the second shell.

9. The package according to claim 4, wherein the first and second shells are axially opposite to each and the first shell covers the first longitudinal closing portion and at least the first half of the at least one barrel, while the second shell covers the second longitudinal closing portion and at least the second half of the at least one barrel.

10. The package according to claim 3, wherein the first tubular element of the at least one jacket completely wraps the lateral wall of the first half of the at least one barrel and at least a portion of the lateral wall of the second half of the at least one barrel, and the first tubular element wraps at least the 10% of the lateral wall of the second half of the at least one barrel,
wherein the second tubular element of the at least one jacket completely wraps the lateral wall of the second half of the at least one barrel, and at least a portion of the lateral wall of the first half of the at least one barrel, and the second tubular element wraps at least the 10% of the lateral wall of the first half of the at least one barrel,
and wherein at least one terminal strip of the second tubular element overlaps a terminal strip of the first tubular element in order to define an overlapping area having an axial extension comprised between 5% and 25% of the axial extension of the at least one barrel lateral wall, and wherein said overlapping area extends at a central longitudinal area of the at least one barrel lateral wall, and wherein the elastically deformed portion of the first tubular element comprises all, or at least a part, of the terminal strip of the first tubular element, and wherein the elastically deformed portion of the second tubular element comprises all, or at least part, of the terminal strip of the second tubular element.

11. The package according to claim 1, wherein:
the at least one barrel lateral wall exhibits a substantially circular shape cross-section having an increasing diameter starting from the first longitudinal closing portion to a maximum or mid cross-section of the at least one barrel and therefore a decreasing trend starting from said maximum or mid cross-section to the second longitudinal closing portion of the at least one barrel, and
the at least one jacket is configured for switching from:
an undeformed condition defined before the engagement around the at least one at least one barrel, wherein the tubular element of the at least one jacket has a substantially cylindrical shape having a diameter greater than the diameter defined by the lateral wall at the first and second longitudinal closing portions and less than the diameter defined by the lateral wall at the maximum at the maximum or mid cross-section of the at least one barrel, to
an at least elastically deformed condition wherein the tubular element is fitted on the at least one barrel and exhibits a diameter varying along the longitudinal axis of the at least one barrel lateral wall, said varying diameter exhibiting a maximum value at said maximum or mid cross-section of the at least one barrel;
wherein the ratio of the diameter defined by the at least one jacket under the undeformed condition to the diameter of the lateral wall at the first and/or second longitudinal closing portions is greater than 1;

and wherein the ratio of the diameter defined by the at least one jacket under the undeformed condition to the diameter of the lateral wall at the maximum or mid cross-section of the at least one barrel is less than 1.

12. The package according to claim 1, wherein the plastic film forming the at least one jacket exhibits a permeability to ethanol ETR (ethanol transmission rate) between 0.15 and 8 g/m$^2$/day;

wherein the ethanol barrier internal layer is interposed between the first and second external layers and comprises a cyclic olefin polymer (COP) or a cyclic olefin copolymer(COC);

wherein the film exhibits an elongation at break equal to at least 500%, and an elastic recovery equal to at least 10%.

* * * * *